US012783370B2

(12) United States Patent
Anguiano et al.

(10) Patent No.: US 12,783,370 B2
(45) Date of Patent: *Nov. 3, 2026

(54) ACTIONS TAKEN BY AN ISLANDED DATA CENTER

(71) Applicant: TRADING TECHNOLOGIES INTERNATIONAL, INC., Chicago, IL (US)

(72) Inventors: Frederick J. Anguiano, Chicago, IL (US); Praveen Kannan, Naperville, IL (US); Jeffrey S. Richards, Aurora, IL (US)

(73) Assignee: Trading Technologies International, Inc., Chicago, IL (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/999,827

(22) Filed: Dec. 23, 2024

(65) Prior Publication Data

US 2025/0123933 A1 Apr. 17, 2025

Related U.S. Application Data

(63) Continuation of application No. 18/214,330, filed on Jun. 26, 2023, now Pat. No. 12,216,555.

(51) Int. Cl.
*G06F 11/20* (2006.01)

(52) U.S. Cl.
CPC .... *G06F 11/2025* (2013.01); *G06F 2201/865* (2013.01)

(58) Field of Classification Search
CPC ............ G06F 11/0706; G06F 11/0709; G06F 11/202–2051
See application file for complete search history.

(56) References Cited

U.S. PATENT DOCUMENTS 12,216,555 B2 * 2/2025 Anguiano ........... G06F 11/1482
2016/0256775 A1 9/2016 Gustafson
(Continued)

FOREIGN PATENT DOCUMENTS

WO 2015179533 A1 11/2015

OTHER PUBLICATIONS

International Search Report and Written Opinion for International Application No. PCT/US2024/035217, mailed Oct. 14, 2024.

*Primary Examiner* — Michael Maskulinski
(74) *Attorney, Agent, or Firm* — McDonnell Boehnen Hulbert & Berghoff LLP

(57) ABSTRACT

A data center, DC includes applications that are controllable by one or more computing entities external to the DC. However, when the DC becomes unavailable to the computing entities, the applications are no longer controllable by the computing entities, which is undesirable. Disclosed techniques include the DC determining, based on an indication that the apps are no longer controllable by the computing entities, that the applications are to operate in a disaster recovery mode. Disclosed techniques include causing an indication that the applications at the DC are to operate in the disaster recovery mode to be communicated to applications that are already executing at the DC when the determination is made and to applications that start to execute at the DC after the determination is made. Disclosed techniques also include a further DC providing a failover for the DC.

16 Claims, 9 Drawing Sheets

(56) References Cited

U.S. PATENT DOCUMENTS

| | | | |
|---|---|---|---|
| 2017/0242764 | A1 | 8/2017 | Antony et al. |
| 2018/0233021 | A1 | 8/2018 | Hiebert et al. |
| 2020/0092404 | A1 | 3/2020 | Wagmann et al. |
| 2022/0255821 | A1 | 8/2022 | Yousouf et al. |
| 2024/0111644 | A1 | 4/2024 | Jacobson et al. |

* cited by examiner

ACTIONS TAKEN BY AN ISLANDED DATA CENTER

CROSS-REFERENCE TO RELATED APPLICATIONS

This application is a continuation of U.S. patent application Ser. No. 18/214,330, filed Jun. 26, 2023, now U.S. Pat. No. 12,216,555, the contents of which are hereby incorporated herein by reference in their entirety for all purposes.

BACKGROUND

A data center, DC, typically includes a group of computing devices that provide computing power for executing applications, or functions thereof. For example, DCs may be used where it would not be feasible or practical to execute one or more resource intensive applications on an individual computing entity, such as a personal computer. In this case, the resource intensive applications, or functions thereof, may instead be executed at the datacenter, thereby taking advantage of the computing power at the data center. Alternatively, or additionally, DCs may be used where it is beneficial that the latency of communications between a computing device executing one or more applications and a further computing device is kept to a minimum. In this case, computing devices of a DC co-located with the further computing device may be used to execute the applications. This minimizes the physical separation of the computing devices and hence inherently minimizes latency of communications between the computing devices. In either case, operation of the applications at the DC are typically controlled by one or more computing entities external to the DC.

BRIEF DESCRIPTION OF THE DRAWINGS

Certain embodiments are disclosed with reference to the following drawings.

Figure 1:
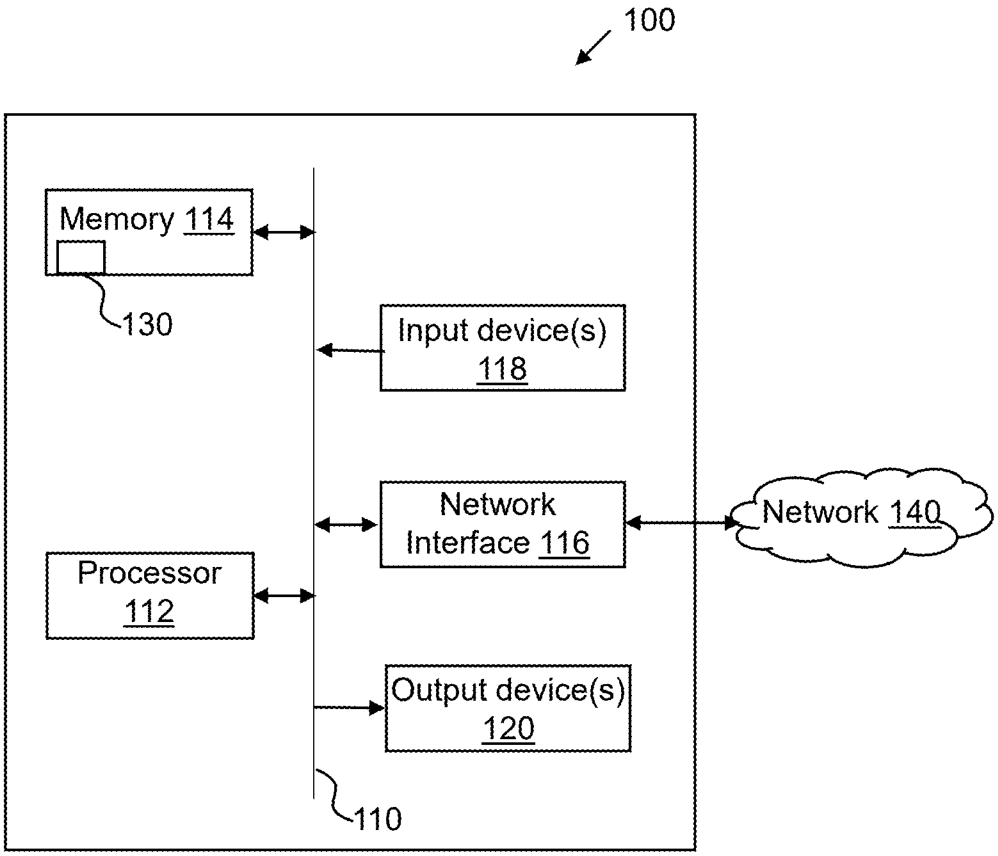
FIG. 1 illustrates a block diagram of an example computing device which may be used to implement certain embodiments.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

The disclosed embodiments generally relate to data centers, DCs, and in particular to methods and systems for controlling applications at a DC. Applications executing at a DC, and/or applications that are to be executed by the DC, may be remotely controllable by one or more computing entities external to the DC. For example, one or more external computing entities may be connected to the DC over a network and may send commands to the applications at the DC to control operation of the applications. This control may include, for example, stopping or changing a function performed by one or more applications. This control can be beneficial, for example, in order to avoid one or more of the applications functioning in an unwanted manner.

However, if the DC becomes unavailable to the external computing entities, then the applications at the DC may no longer be controllable by the external computing entities. For example, this may occur where the DC loses connection to the network, or experiences some other disaster or failure, be that of hardware or software, that prevents commands from the external computing entities from reaching the applications. In such cases, the applications may continue to execute, or new applications may start to execute, at the DC without control by the external computing entity. Such a situation, also referred to as 'islanding' of the DC, may result in the applications functioning in an unwanted manner. Moreover, in such cases, it may be desired to failover the one or more applications to a further DC that is not islanded, for example to restore the remotely controllable functioning of the applications. However, the applications executing, or starting to execute, at the islanded DC may prevent or hinder an effective failover of the applications to the further DC. It would be desirable to mitigate at least some of these drawbacks.

I. Brief Description of Certain Embodiments

Certain embodiments provide a method of controlling applications at a data center, DC. The applications are controllable by one or more computing entities external to the DC. The method includes, at a computing system of the DC, obtaining an indication that the applications at the DC are no longer controllable by the one or more computing entities external to the DC. The method includes, determining, based on the indication, that the applications at the DC are to operate in a disaster recovery mode. The method includes, in response to the determination, causing an indication that the applications at the DC are to operate in the disaster recovery mode to be communicated to one or more of the applications at the DC that are already executing at the DC when the determination is made. The method includes, in response to the determination, causing the indication that the applications at the DC are to operate in the disaster recovery mode to be communicated to one or more of the applications at the DC that start to execute at the DC after the determination is made. Causing the indication to be communicated to the applications allows for the applications to operate in a disaster recovery mode responsive to the determination that the applications are no longer controllable by an external computing entity. This may, in turn, help prevent the applications functioning in an unwanted manner when the DC is islanded and/or may help facilitate an effective failover of the of the applications to a further DC.

Moreover, causing the indication that the applications at the DC are to operate in the disaster recovery mode to be communicated to the applications allows for the applications to determine how to operate in response to the indication. This may be, for example, as opposed to issuing a termination command or signal to the applications. This allows for flexibility in the way in which each application responds to the indication. That is, this allows for flexibility in how each application defines operation in the disaster recovery mode. Moreover, causing the indication to be communicated to both applications already executing at the DC and applications that start to execute after the determination, may help ensure that all applications at the DC operate in a disaster recovery mode when the DC is islanded, even those that might start execution after the islanding is detected. This may, in turn, help further prevent applications from functioning in an unwanted manner and/or facilitate an effective failover of the applications to a further DC.

In certain embodiments, causing the indication to be communicated to the one or more of the applications at the DC that start to execute at the DC after the determination is made, includes, at the computing system of the DC: causing data, representing the indication, to be written to a location in storage which applications are configured to access when starting to execute at the DC. This allows for the indication to be communicated reliably and/or efficiently to applications that start at the DC after the determination is made. For example, this allows for the indication to be communicated to the applications that start at the DC after the determination is made, even in the case where the computing system that makes the determination shuts down before applications start to execute. The indication may therefore be reliably communicated. As another example, this may allow the indication to be communicated to the applications that start at the DC after the determination is made more efficiently than, for example, repeatedly sending messages to each new application that starts to execute after the determination is made. The indication may therefore be efficiently communicated.

In certain embodiments, the one or more of the applications at the DC already executing at the DC are configured to access the location in storage, and causing, at the computing system of the DC, the data to be written to the location in storage causes the indication to be communicated to the one or more of the applications at the DC already executing at the DC. This allows for the indication to be communicated to all applications at the DC, whether currently executing or yet to start execution, by writing the data once to one location in storage. This provides for efficient and reliable communication of the indication to the applications.

In certain embodiments, causing, at the computing system of the DC, the data to be written to the location in storage includes: causing a function to be modified so as to represent the indication, the function being stored in a library that is used by the applications at the DC, wherein the library is accessible by the applications at the DC when starting to execute at the DC, the function being one that the applications at the DC call from the library when starting to execute at the DC. This provides a particularly efficient means by which to communicate the indication to the applications. In particular, this allows for a minimization of any modifications to the application or code thereof that may be needed to allow the indication to be communicated to the applications. For example, this does not require the applications to be integrated with an applications programming interface for a database, for example. Instead, the applications or code thereof need only call a function in a shared library.

In certain embodiments, causing the indication to be communicated to the one or more applications at the DC already executing at the DC includes, at the computing system of the DC: causing data, representing the indication, to be written to a location in storage which applications are configured to access when executing at the DC. This allows for the indication to be reliably and/or efficiently communicated to the applications already executing at the DC. For example, this provides for reliable communication as the location in storage provides a persistent record of the indication and, for example, does not rely on a message being transmitted successfully to the application. As another example, this provides for efficient communication as it does not necessarily require the overhead of transmitting messages to all applications executing at the DC or knowledge of what applications are currently executing on the DC.

In certain embodiments, causing the indication to be communicated to the one or more applications at the DC already executing at the DC includes, at the computing system of the DC: transmitting a message, including data representing the indication, to the one or more applications at the DC already executing at the DC, over an internal communications network of the DC. For example, this may be in addition to, or instead of, writing the data representing the indication to the location in storage. Depending on how frequently an application is configured to read the indication written to the location in storage, transmitting the message may allow the application to be informed of the indication faster than writing to the storage location alone. This also provides flexibility in how an executing application receives the indication. Further, communicating the indication both using a message and writing to the storage location may provide a greater chance that the indication will be received by the application, for example in case the storage location to which the indication is written is not accessible by an application for some reason.

In certain embodiments, transmitting the message includes multicasting the message to the one or more applications at the DC already executing at the DC over the internal communications network. This provides an efficient way to communicate the indication to multiple applications at the DC, for example as compared to providing the indication to each application using unicast messaging. Further, this allows that the computing system of the DC need not necessarily be aware of all the applications currently executing at the DC, allowing for efficient operation of the computing system of the DC.

In certain embodiments, obtaining the indication that applications at the DC are no longer controllable by the one or more entities external to the DC includes, at the computing system of the DC: determining that one or more communications connections between the DC and one or more further data centers, DCs, have become inoperative. This provides an efficient and reliable way for the computing system at the DC to determine that the applications at the DC are no longer controllable by the one or more entities external to the DC. Specifically, by determining that communications connections with other DCs, which communications connections may otherwise be constantly maintained, have become inoperative, the computing system may reliably and efficiently infer that the DC has become islanded, and hence that the applications at the DC are no longer controllable by the one or more entities external to the DC.

Certain embodiments provide a method of controlling applications at a data center, DC, the applications being controllable by one or more computing entities external to the DC, the DC including a computing system that determines, on the basis of an indication that the applications at the DC are no longer controllable by the one or more entities external to the DC, that the applications at the DC are to operate in a disaster recovery mode. The method includes, at each of one or more of the applications at the DC that are already executing at the DC when the determination is made: obtaining an indication, caused to be communicated by the computing system of the DC, that the applications at the DC are to operate in a disaster recovery mode; and in response to obtaining the indication, operating the application in a disaster recovery mode. The method includes, at each of one or more of the applications at the DC that start to execute at the DC after the determination is made: obtaining the indication, caused to be communicated by the computing system of the DC, that the applications at the DC are to operate in the disaster recovery mode; and in response to obtaining the indication, operating the application in a disaster recovery mode. This helps prevent the applications from functioning in an unwanted manner when the DC is islanded and/or may help facilitate an effective failover of the of the applications to a further DC.

In certain embodiments, the indication is caused to be communicated by the computing system of the DC by causing data, representing the indication, to be written to a location in storage, and obtaining the indication includes: at each of the one or more applications at the DC that start to execute at the DC after the determination is made: accessing the location when starting to execute the application to read the data representing the indication. This provides for reliable operation of the disaster recovery mode when the DC is islanded. For example, this provides that, even for applications that start to execute after the determination is made, and even if the computing system of the DC becomes inoperative before those applications start to execute, the applications will still operate in a disaster recover mode.

In certain embodiments, obtaining the indication includes: at each of the one or more applications at the DC that are already executing at the DC when the determination is made: accessing the location during execution of the application to read the data representing the indication. For example, applications may access the location in storage when starting to execute as well as while executing, for example periodically. This allows that, by accessing data written once to one location in storage, all applications (whether currently executing or yet to start executing) will operate in a disaster recovery mode. This provides for efficient and reliable disaster recovery mode operation.

In certain embodiments, the indication is caused to be communicated by the computing system of the DC by causing a function to be modified so as to represent the indication, the function being stored in a library accessible to the applications at the DC, and obtaining the indication includes: at each of the one or more applications at the DC that start to execute at the DC after the determination is made: accessing the library to call the modified function when starting to execute the application. This allows a particularly efficient means by which the applications can determine the mode to operate in. In particular, this does not require the applications to be integrated with any new application programming interface for a database, for example. Rather the applications or code thereof need only call the function in the shared library.

In certain embodiments, the indication is caused to be communicated by the computing system of the DC by transmitting a message, to the one or more applications at the DC already executing at the DC, and obtaining the indication includes: at each of the one or more applications at the DC already executing at the DC when the determination is made: receiving the message, from the computing system of the DC, over an internal communications network of the DC. For example, this may be in addition to, or instead of, accessing the shared library to call the function. Depending on how frequently the application reads the indication written to the location in storage and the time at which the message is received, receiving the message may allow the application to be informed of the indication faster than accessing the location in storage alone. This also provides flexibility in how the application receives the indication. Both reading the location in storage and receiving the message provides a greater chance that the indication will be obtained by the application, for example in case the location to which the indication is written is not accessible by the application for some reason.

In certain embodiments, at each of the one or more of the applications at the DC that are already executing at the DC when the determination is made, operating the application in a disaster recovery mode includes one or more of: terminating one or more communications connections, established between the application and a further computing entity, over which the application sends data to the further computing entity; ceasing routing of data by the application to one or more further applications at the DC; ceasing processing of data by the application; and shutting down the application. Terminating communications connection between the application and the further computing entity may help allow a failover application at a further DC to establish communications connections with the further computing entity instead. For example, the further computing entity may only support a certain number of communications connections having a certain attribute in common. For example, the further computing entity may only support one communication connection per attribute. Accordingly, if a communication connection, having a certain attribute, between the application and the further computing entity were not terminated, this may prevent the failover application from establishing a communications connection, having the certain attribute, between the failover application and the further computing entity, and hence the failover may be prevented. However, by terminating the communications connection, the effective failover of the application may be facilitated. Ceasing routing of data to a further application of the DC may prevent the further application from taking action based on the data and hence may help prevent the consequences thereof from taking place. This may help prevent unwanted actions from being performed and/or may facilitate an effective failover of the application and/or the further application to the further DC. For example, this may prevent the routing of the data and/or the action taken based on the data from being performed twice: once at the islanded DC, and again at the further DC. Ceasing processing of data by the application may help prevent unwanted actions from being performed by the application and/or may facilitate an effective failover of the application to the further DC. For example, this may help ensure that the processing of the data is not performed twice: once at the application at the islanded DC and again at a failover of the application at the further DC. Shutting down the application may ensure that no functions are performed by the application that could, for example, be unwanted or negatively affect a failover of the application to the further DC.

In certain embodiments, at each of the one or more of the applications at the DC that start to execute at the DC after the determination is made, operating the application in a disaster recovery mode includes one or more of: preventing the application from establishing a communications connection, to a further computing entity, over which the application sends data to the further computing entity; preventing the application from routing data to one or more further applications of the DC; preventing the application from processing data; and shutting down the application before one or more functions of the application are performed. Preventing the application from establishing the communications connection may, for example, prevent interference with a failover application at a further DC establishing a communications connection with the further computing entity, and hence may help facilitate effective failover of the application to the further DC. Preventing the application from routing data may help prevent unwanted actions from being performed and/or may facilitate an effective failover of the application and/or the further application to the further DC. Preventing the application from processing data by the application may help prevent unwanted actions from being performed by the application and/or may facilitate an effective failover of the application to another DC. Shutting down the application may ensure that functions that could, for example, be unwanted or negatively affect a failover of the application to another DC, are not performed.

Certain embodiments provide a computing system for controlling applications at a data center, DC, the applications being controllable by one or more computing entities external to the DC, the computing system including: a memory; and at least one processor configured to: obtain an indication that applications at the DC are no longer controllable by the one or more computing entities external to the DC; determine, based on the indication, that the applications at the DC are to operate in a disaster recovery mode; and in response to the determination: cause an indication that the applications at the DC are to operate in a disaster recovery mode to be communicated to one or more of the applications at the DC that are already executing at the DC when the determination is made; and cause the indication that the applications at the DC are to operate in the disaster recovery mode to be communicated to one or more of the applications at the DC that start to execute at the DC after the determination is made. As above, this may help prevent applications from functioning in an unwanted manner and/or facilitate an effective failover of the applications to a further DC.

Certain embodiments provide a tangible computer readable medium including instructions which, when executed, cause at least one processor of a computing system to perform functions, the computing system being for controlling applications at a data center, DC, the applications being controllable by one or more computing entities external to the DC, the functions including at least: obtaining an indication that applications at the DC are no longer controllable by the one or more computing entities external to the DC; determining, based on the indication, that the applications at the DC are to operate in a disaster recovery mode; and in response to the determination: causing an indication that the applications at the DC are to operate in a disaster recovery mode to be communicated to one or more of the applications at the DC that are already executing at the DC when the determination is made; and causing the indication that the applications at the DC are to operate in the disaster recovery mode to be communicated to one or more of the applications at the DC that start to execute at the DC after the determination is made. As above, this may help prevent applications from functioning in an unwanted manner and/or facilitate an effective failover of the applications to a further DC.

Certain embodiments provide a method including: at a first computing system of a first data center, DC, the first DC having first applications controllable by one or more computing entities external to the first DC: obtaining an indication that the first applications at the first DC are no longer controllable by the one or more computing entities external to the first DC; determining, based on the indication, that the first applications at the first DC are to operate in a disaster recovery mode; and in response to the determination: causing an indication that the first applications at the first DC are to operate in the disaster recovery mode to be communicated to one or more of the first applications at the first DC that are already executing at the first DC when the determination is made; and causing the indication that the first applications at the first DC are to operate in the disaster recovery mode to be communicated to one or more of the first applications at the first DC that start to execute at the first DC after the determination is made. The method includes at a second computing system of a second DC: obtaining an indication that the first applications at the first DC are no longer controllable by the one or more computing entities external to the first DC; determining, based on the indication, that the second DC is to provide a failover for the first DC; and in response to the determination, causing one or more second applications at the second DC to operate in a failover mode to provide a failover for one or more of the first applications at the first DC. This allows for the applications at the first DC which are no longer controllable by the one or more external computing entities to be effectively failed over the second DC. This, in turn, may allow for the functions provided by the applications to be effectively continued at the second DC.

In certain embodiments, obtaining the indication that the first applications at the first DC are no longer controllable by the one or more computing entities external to the first DC includes one or both of: at the first computing system of the first DC: determining that one or more communications connections between the first DC and the second DC have become inoperative; and at the second computing system of the second DC: determining that the one or more communications connections between the first DC and the second DC have become inoperative. The determination being based (at least) on the status of a communications connection between the first DC and the second DC may allow for the second DC to provide a fast failover for the first DC when it is determined that the first applications at the first DC are no longer controllable by the one or more computing entities external to the first DC.

Certain embodiments provide a system including a first data center, DC, and a second DC. The first DC includes: a first computing system for controlling first applications at the first DC, the first applications being controllable by one or more computing entities external to the first DC, the first computing system including: a first memory; and at least one first processor configured to: obtain an indication that the first applications at the first DC are no longer controllable by the one or more computing entities external to the first DC; determine, based on the indication, that the first applications at the first DC are to operate in a disaster recovery mode; and in response to the determination: causing an indication that the first applications at the first DC are to operate in the disaster recovery mode to be communicated to one or more of the first applications at the first DC that are already executing at the first DC when the determination is made; an causing the indication that the first applications at the first DC are to operate in the disaster recovery mode to be communicated to one or more of the first applications at the first DC that start to execute at the first DC after the determination is made. The second DC includes: a second computing system including: a second memory; and at least one second processor configured to: obtain an indication that the first applications at the first DC are no longer controllable by the one or more entities external to the first DC; determine, based on the indication, that the second DC is to provide a failover for the first DC; and in response to the determination, causing one or more second applications at the second DC to operate in a failover mode to provide a failover for one or more of the first applications at the first DC. As above, this allows for the applications at the first DC which are no longer controllable by the one or more external computing entities to be effectively failed over the second DC. This, in turn, may allow for the functions provided by the applications to be effectively continued at the second DC.

II. Example Computing Device

FIG. 1 illustrates a block diagram of an example computing device 100. The computing device 100 may be used to implement certain embodiments described herein. In other examples, other computing devices may be used. The computing device 100 includes a communication bus 110, a processor 112, a memory 114, a network interface 116, an input device 118, and an output device 120. The processor 112, memory 114, network interface 116, input device 118 and output device 120 are coupled to the communication bus 110. The computing device 100 is connected to an external network 140, such as a local area network (LAN) or a wide area network (WAN), such as the Internet. The computing device 100 is connected to the external network 140 via the network interface 116. The computing device 100 may include additional, different, or fewer components. For example, multiple communication buses (or other kinds of component interconnects), multiple processors, multiple memory devices, multiple interfaces, multiple input devices, multiple output devices, or any combination thereof, may be provided. As another example, the computing device 100 may not include an input device 118 or output device 120. As another example, one or more components of the computing device 100 may be combined into a single physical element, such as a field programmable gate array (FPGA) or a system-on-a-chip (SoC).

The communication bus 110 may include a channel, electrical or optical network, circuit, switch, fabric, or other mechanism for communicating data between components in the computing device 100. The communication bus 110 may be communicatively coupled with and transfer data between any of the components of the computing device 100.

The processor 112 may be any suitable processor, processing unit, or microprocessor. The processor 112 may include one or more general processors, digital signal processors, application specific integrated circuits, FPGAs, analog circuits, digital circuits, programmed processors, and/or combinations thereof, for example. The processor 112 may be a multi-core processor, which may include multiple processing cores of the same or different type. The processor 112 may be a single device or a combination of devices, such as one or more devices associated with a network or distributed processing system. The processor 112 may support various processing strategies, such as multi-processing, multi-tasking, parallel processing, and/or remote processing. Processing may be local or remote and may be moved from one processor to another processor. In certain embodiments, the computing device 100 is a multi-processor system and, thus, may include one or more additional processors which are communicatively coupled to the communication bus 110.

The processor 112 may be operable to execute logic and other computer readable instructions encoded in one or more tangible media, such as the memory 114. As used herein, logic encoded in one or more tangible media includes instructions which may be executable by the processor 112 or a different processor. The logic may be stored as part of software, hardware, integrated circuits, firmware, and/or micro-code, for example. The logic may be received from an external communication device via a communication network 140. The processor 112 may execute the logic to perform the functions, acts, or tasks described herein.

The memory 114 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 114 may include any desired type of mass storage device including hard disk drives, optical media, magnetic tape or disk, etc.

The memory 114 may include one or more memory devices. For example, the memory 114 may include cache memory, local memory, a mass storage device, volatile memory, non-volatile memory, or a combination thereof. The memory 114 may be adjacent to, part of, programmed with, networked with, and/or remote from processor 112, so the data stored in the memory 114 may be retrieved and processed by the processor 112, for example. The memory 114 may store instructions which are executable by the processor 112. The instructions may be executed to perform one or more of the acts or functions described herein.

The memory 114 may store software 130 implementing the disclosed techniques. In certain embodiments, the software 130 may be accessed from or stored in different locations. The processor 112 may access the software 130 stored in the memory 114 and execute computer-readable instructions included in the software 130.

The network interface 116 may include one or more network adaptors. The network adaptors may be wired or wireless network adaptors. The network interface 116 may allow communication by the computing device 100 with an external network 140. The computing device 100 may communicate with other devices via the network interface 116 using one or more network protocols such as Ethernet, Internet Protocol (IP), Transmission Control Protocol (TCP), User Datagram Protocol (UDP), wireless network protocols such as Wi-Fi, Long Term Evolution (LTE) protocol, or other suitable protocols.

The input device(s) 118 may include a positional input device, such as a mouse, touchpad, touchscreen, or the like; a keyboard, button, switch, or the like; and/or other human and machine interface devices. The output device(s) 120 may include a display, which can be a liquid crystal display (LCD), a cathode-ray tube (CRT), a light emitting diode (LED) display (such as an OLED display), or other suitable display.

In certain embodiments, during an installation process, the software 130 may be transferred from the input device 118 and/or the network 140 to the memory 114. When the computing device 100 is running or preparing to run the software 130, the processor 112 may retrieve the instructions from the memory 114 via the communication bus 110.

III. Example System

Figure 2:
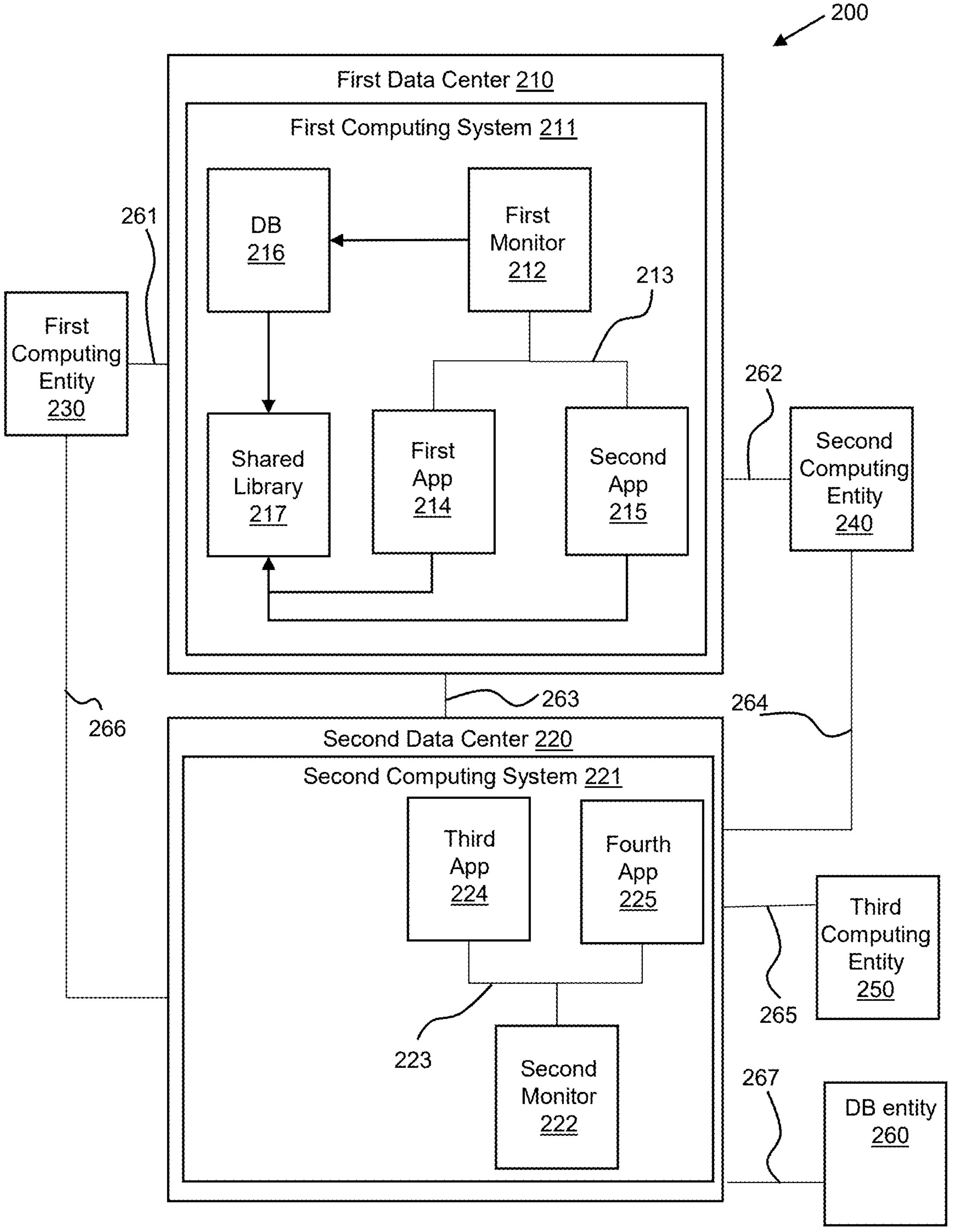
FIG. 2 illustrates a block diagram of an example system in which certain embodiments may be implemented.

FIG. 2 illustrates an example system 200 in which certain embodiments disclosed herein may be employed. The system 200 includes a first data center, DC, 210 a second DC 220, a first computing entity 230, a second computing entity 240, a third computing entity 250, and a database entity 260. The first DC 210 includes a first computing system 211, which includes a first monitor 212, an internal communications network 213, a first application, app, 214, a second app 215, a database 216, and a shared library 217. The second DC 220 includes a second computing system 221, which includes a second monitor 222, an internal communications network 223, a third app 224 and a fourth app 225. The first computing entity 230 is in communication with the first DC 210 over a first communications network 261. The first DC 210 is in communication with the second computing entity 240 over a second communications network 262. The first DC 210 is in communication with the second DC 220 over a third communications network 263. The second DC 220 is in communication with the second computing entity 240 over a fourth communications network 264. The second DC 220 is in communication with the third computing entity 250 over a fifth communications network 265. The first computing entity 230 is in communication with the second DC 220 over a sixth communication network 266. The second DC 220 is in communication with the database entity 260 over a seventh communication network 267. In examples, one or more of the first to seventh communications networks 261-267 may include one or more of a local area network, a wide area network, a multicast network, a wireless network, a virtual private network, an internal network, a cellular network, a peer-to-peer network, a point-of-presence, a dedicated line, the Internet, a shared memory system, and/or a proprietary network. One or more of the first to seventh communications networks 261-267 may be different from one another or may be the same network.

The first computing system 211 of the first DC 210 may be implemented by or otherwise include one or a plurality of the computing devices 100 described above with reference to FIG. 1. One or both of the first app 214 and the second app 215 may be implemented as software executed on one or more computing devices (for example, the computing device 100 described above with reference to FIG. 1) of the first computing system 211. For example, the first app 214 and the second app 215 may be executed on respective different computing devices (for example, the computing device 100 described above with reference to FIG. 1) of the computing system 211, although it will be appreciated that this need not necessarily be the case and other configurations are possible.

The first app 214 and the second app 215 are configured to perform one or more functions. For example, the functions may include processing data, routing data to one or more other applications, establishing one or more communications connections with a computing entity, and/or sending data to and/or receiving data from a computing entity. In this example, the first app 214 is configured to process data and route the processed data to the second app 215 over the internal communications network 213. The second app 215 is configured to establish one or more connections, such as TCP connections, with the second computing entity 240 over the second communications network 262. The second app 215 receives data from the first app 214, further processes the data, and sends the further processed data to the second computing entity 240 over the established one or more connections. The second computing entity 240 may take an action based on the data sent by the second app 215. Accordingly, functions carried out by the first app 214 and/or the second app 215 may cause actions to be taken by the second computing entity 240. In some examples (as illustrated in FIG. 2) the second computing entity 240 may be external to the first DC 210. However, in other examples (not shown), the second computing entity 240 may be part of the first DC 210, that is, co-located with the first computing system 211.

One or both of the first app 214 and the second app 215 are remotely controllable by the first computing entity 230. The first computing entity 230 is external to the first DC 210. Under normal or expected operating conditions, the apps 214, 215 of the first DC may be remotely controlled by the first computing entity 230. For example, the first computing entity 230 may send commands, via the first communications network 261, to one or more of the apps 214, 215 in order to control operation of the apps 214, 215. This control may include, for example, one or more of initiating execution of an app 214, 215 at the first DC 210, starting, changing, or stopping a function performed by an app 214, 215, and shutting down an app 214, 215. For example, it may not be feasible or practical or otherwise desired to store or execute the apps 214, 215 on the first computing entity 230. In this case, the apps 214, 215 are instead stored and executed by the first computing system 211 of the first data center 210 but operate under the control of the first computing entity 230. As another example, it may be beneficial or otherwise desired that the apps 214, 215 execute on a computing device that is located physically close to the second computing entity 240, in order that latency of communications between the apps 214, 215 and the computing entity 240 is minimized. The first computing entity 230 may not be located physically close to the second computing entity 240. However, the first computing system 211 may be located physically close to, or be co-located with, the second computing entity 240. In this case, the apps 214, 215 are stored and executed by the first computing system 211 of the first data center 210 in order to minimize latency of communications between the apps 214, 215 and the second computing entity 240, while operating under the control of the first computing entity 230.

However, a situation may arise in which the first DC 210 is no longer available to the first computing entity 230, that is, the apps 214, 215 are no longer controllable by the first computing entity 230. For example, this may occur where the first DC 210 loses connection to the first communication network 261, or experiences some other disaster or failure, be that of hardware or software, that prevents commands from the first computing entity 230 from reaching the apps 214, 215. In cases where the apps 214, 215 are no longer controllable by the first computing entity 230, the apps 214, 215 may continue to execute, or start to execute, at the first DC 210 without control by the first computing entity 203. For example, the second app 215 may continue sending or start to send data to the second computing entity 240 over a communications connection established on the second communications network 262, and the first computing entity 230 may no longer be able to change or stop this. This can be an undesirable situation as this may cause actions to be taken by the second computing entity 240 that the first computing entity 230, had it had control over the apps 214, 215, would have controlled the apps 214, 215 to avoid causing.

The first monitor 212 of the first DC 210 may be implemented as software executed on one or more computing devices (for example, the computing device 100 described above with reference to FIG. 1) of the first computing system 211. In examples, the first monitor 212 may be executed on a different computing device (for example, the computing device 100 described above with reference to FIG. 1) of the computing system 211 than the computing device(s) of the first app 214 and/or second app 215, although it will be appreciated that this need not necessarily be the case and other configurations are possible.

The first monitor 212 is configured to obtain an indication that that the apps 214, 215 at the first DC 210 are no longer controllable by the first computing entity 230 external to the first DC 210. As described in more detail below with reference to FIG. 3, obtaining the indication that applications at the first DC 210 are no longer controllable by the first computing entity 230 may include the first monitor 212 determining that one or more communications connections between the first DC 210 and one or more further DCs (such as the second DC 220) have become inoperative. For example, the first monitor 212 may be configured to monitor a status of a set of one or more communications connections between the first DC 210 and the second DC 220 and one or more further sets of one or more communications connections between the first DC 210 and one or more further DCs (not shown in FIG. 2). The first monitor 212 may be configured to, based on one or more of these statuses, determine that the first DC 210 is no longer available to the first computing entity 230, and hence that the apps 214, 215 are no longer controllable by the first computing entity 230.

The first monitor 212 is configured to determine, based on the indication that the apps 214, 215 are no longer controllable by the first computing entity 230, that the apps 214, 215 are to operate in a disaster recovery mode. For example, as described in more detail below, depending on the app 214, 215, operating in the disaster recovery mode may include stopping or preventing one or more of the functions of the app 214, 215 from being performed, hence mitigating consequences of the apps 214, 215 continuing or starting to perform one or more of their functions without the external control by the first computing entity 230. In examples, the determination by the first monitor 212 that the apps 214, 215 are to operate in a disaster recovery mode may be responsive to the determination that the apps 214, 215 are no longer controllable by the first computing entity 230. This may allow for the time during which the apps 214, 215 are operating in a normal operating mode but not controllable by the first computing entity 230 to be minimized.

The first monitor 212 is configured to, in response to the determination that the apps 214, 215 at the first DC 210 are to operate in a disaster recovery mode, cause an indication that the apps 214, 215 are operate in the disaster recovery mode to be communicated to the apps 214, 215. As described in more detail below, the first monitor 212 causes this indication to be communicated to apps 214, 215 that are already executing at the first DC 210 when the determination is made, and to apps 214, 215 that start to execute at the first DC 210 after the determination is made. This helps ensure that apps 214, 215 at the first DC 210 operate in a disaster recovery mode, even if the apps 214, 215 start to execute after the determination is made.

In this example, the first monitor 212 is configured to write data to the database 216. The database 216 is stored in storage of the first computing system 211. For example, the database 216 may be stored in memory of a computing device (for example, the memory 114 of a computing device 100 described above with reference to FIG. 1) of the first computing system 211. In examples, the computing device at which the database 216 is stored may be different to the computing device(s) implementing the first app 214, second app 215, and/or the first monitor 212, although it will be appreciated that this need not necessarily be the case and that other configurations are possible.

In this example, the database 216 stores data at locations identified by respective paths. For example, similar to a file system, the path of a particular location may be made up of a hierarchical sequence of path elements. Accordingly, data may be written to or read from a specific path of the database 216. The database 216 includes a specific disaster recovery, DR, path that records data indicative of whether or not the apps 214, 216 are to operate in a disaster recovery mode. For example, the DR path may record "false" where the apps 214, 215 are to operate normally, that is, not in a disaster recovery mode, and may record "true" where the apps 214, 215 are to operate in a disaster recovery mode. The database 216 is configured to provide callbacks to the shared library 217 whenever the data recorded at the DR path is updated. Specifically, the shared library 217 subscribes to the database 216 to receive updates whenever the data at the DR path is updated. Whenever the data recorded at the DR path is updated, the database 216 sends a callback to the shared library 217 indicating that an update has occurred, and the updated data recorded at the DR path.

In response to the determination that the apps 214, 215 at the first DC 210 are to operate in a disaster recovery mode, the first monitor 212 writes data representing the indication that the apps 214, 215 are to operate in the disaster recovery mode to the database 216. Specifically, the first monitor 212 accesses the DR path at the database 216 and writes data representing the indication that the apps 214, 215 are to operate in the disaster recovery mode. Specifically, the first monitor 212 may overwrite "false" recorded at the DR path of the database to "true". The database 216 sends a callback to the shared library 217 indicating the update to the DR path, specifically that the data at the DR path has been updated to "true". Accordingly, the indication that the apps 214, 215 are to operate in the disaster recovery mode is communicated to the shared library 217.

The shared library 217 is stored in storage of the first computing system 211. For example, the shared library 217 may be stored in memory of a computing device (for example, the memory 114 of a computing device 100 described above with reference to FIG. 1) of the first computing system 211. In examples, the computing device at which the shared library 217 is stored may be different to the computing device(s) implementing the first app 214, second app 215, the first monitor 212 and/or the database 216, although it will be appreciated that this need not necessarily be the case and that other configurations are possible. The shared library 217 is used by the apps 214, 215 at the first DC 210. For example, the library 217 may be a library that is shared by the apps 214, 215. The shared library 217 may be accessible by the apps 214, 215. The shared library 217 may be a location in storage that the apps 214, 215 are configured to access. The apps 214, 215 may be configured to access the shared library 214, 215 when starting to execute at the first DC 210 and when executing at the first DC 210.

The shared library 217 includes a disaster recovery, DR, function that the apps 214, 215 are configured to call. In one example the apps 214, 215 are each configured to call the DR function in the shared library 217 when starting to execute at the first DC 210. The apps 214, 215 may also each be configured to call the DR function in the shared library 217 when executing at the first DC 210, for example periodically during execution. Specifically, each app 214, 215 includes code that calls the DR function in the shared library 217. For example, the DR function may be "IsDREnabled( )". Each app 214, 215 may be configured such that when the app 214, 215 calls the DR function and the argument is set to "false", that is, the DR function is "IsDREnabled(false)", then the app 214, 215 operates in a normal operating mode. However, when the app 214, 215 calls the DR function and the argument is set to "true", that is, the DR function is "IsDREnabled(true)", then the app 214, 215 operates in a disaster recovery mode. The shared library 217 may be configured to modify the DR function in response to receiving callbacks from the database 216. Specifically, the shared library 217 may be configured to write the argument of the DR function to "true" in response to receiving a callback from the database 216 indicating that the data at the DR path at the database 216 has been updated to "true".

Accordingly, in this example, when the first monitor 212 determines that the apps 214, 215 at the first DC 210 are to operate in a disaster recovery mode, the first monitor 212 writes the data recorded at the DR path of the database 216 to indicate "true". This causes the database 216 to send a callback to the shared library 217 indicating that the data at the DR path has been updated to "true". This, in turn, causes the shared library 217 to write the argument of the DR function of the shared library 217 to "true". Apps 214, 215 already executing when the determination is made, as well as apps 214, 215 that start to execute after the determination is made, will call the DR function from the shared library 217. The indication that the apps 214, 215 are to operate in a disaster recovery mode is caused to be communicated to apps 214, 215 already executing when the determination is made as well as to apps 214, 215 that start to execute at the first DC 210 after the determination is made. Data representing the indication may be caused to be written to a location in storage (that is, the shared library) that apps 214, 215 are configured to access when starting to execute at the first DC and that apps 214, 215 and when executing at the first DC 210. In some arrangements, a function (that is, the DR function) that the apps 214, 215 call from a library (that is, the shared library 217) when starting to execute at the DC 210 and when executing at the DC 210 is caused to be modified so as to represent the indication.

In this example, the first monitor 212 is in communication with the first app 214 and the second app 215 over the internal communications network 213. The internal communications network 213 may be, for example, a local area network. The internal communications network 213 may be configured for multicast messaging. For example, the first app 214 and the second app 215 may subscribe to multicast messages transmitted by the first monitor 212 over the internal communications network 213. In this example, the first monitor 212 is configured to, in response to a determination that the apps 214, 215 are to operate in a disaster recovery mode, transmit a message, including data representing the indication that the apps 214, 215 are to operate in a disaster recovery mode, to one or more apps 214, 215 that are already executing at the DC. For example, this message may be a multicast message. For example, the apps 214, 215 may be configured to, when starting to execute, subscribe to receive multicast messages from the first monitor 212. Accordingly, the apps 214, 215 already executing when the determination is made may receive a multicast message from the first monitor indicting that the apps 214, 215 are to operate in a disaster recovery mode. Accordingly, the indication is caused to be communicated to the apps 214, 215 already executing at the DC 210 when the determination is made. The apps 214, 215 are configured to, in response to receiving such a message from the first monitor 212, operate in the disaster recovery mode.

In examples, the first monitor 210 may cause the indication to be communicated to an app 214, 215 already executing at the first DC 210 by way of the shared library 217 and by way of the message sent over the internal communications network 213. In this case, the app 214, 215 may be operate in the disaster recovery mode in response to whichever is received first. For example, if the app 214, 215 happens to call the DR function from the shared library 217 after the DR function has been modified to represent the indication but before the message representing the indication is received, the app 214, 215 may operate in the disaster recovery mode in response to calling the DR function. On the other hand, if the app 214, 215 happens to receive the message representing the indication in-between calls to the DR function from the shared library 217 and before the DR function has been modified to represent the indication, the app 214, 215 may operate in the disaster recovery mode in response to receiving the message.

Each app 214, 215 is configured to obtain the indication, caused to be communicated by the first computing system 211 of the first DC 210, that the apps 214, 215 are to operate in a disaster recovery mode. For example, for an app 214, 215 that starts to execute after the first monitor 212 determines that the apps 214, 215 are to operate in the disaster recovery mode, the app 214, 215 may obtain the indication by, when starting to execute, accessing a location in storage at which data representing the indication is stored to read the data. For example, the app 214, 215 may, when starting to execute, access the shared library 217 to call the DR function (whose argument has been written to "true") from the shared library 217. For an app 214, 215 that is already executing when the first monitor 212 determines that the apps 214, 215 are to operate in the disaster recovery mode, the app 214, 215 may obtain the indication by, during execution of the app 214, 215, accessing the location in storage to read the data representing the indication. For example, the app 214, 215 may, during execution of the app 214, 215, access the shared library 217 to call the DR function (whose argument has been written to "true") from the shared library 217. Alternatively, the app 214, 215 may obtain the indication by, during execution of the app 214, 215, receiving the message from the first monitor 212 over the internal communications network 213.

Each app 214, 215 is configured to, in response to obtaining the indication that the apps 214, 215 are to operate in a disaster recovery mode, operate the application in a disaster recovery mode. For example, depending on the app 214, 215, operating in the disaster recovery mode may include stopping or preventing one or more of the functions of the app from being performed.

As an example, as mentioned above, during normal operation, the first app 214 may process data and route the processed data to the second app 215 over the internal communications network 213. The second app 215 may receive the processed data from the first app 214, and further process the data. The second app 215 may establishes one or more communications connections with the second computing entity 240 over the second communications network 262 and send data the further processed data to the second computing entity 240 over the communications connections.

In this example, where the second app 215 is already executing at the first DC 210, operating the second app 215 in the disaster recover mode may include ceasing the further processing of the data by the second app 215 and/or terminating the one or more established communications connections. Alternatively, where the second app 215 starts to execute after the determination is made, operating the second app 215 in the disaster recovery mode may include preventing the second app 215 from further processing the data and/or preventing the second app 215 from establishing the communications connections to the second computing entity 240. In either case, this stops the second app 215 from sending data to the second computing entity 240, and hence prevents actions being taken by the second computing entity 240 based on data sent by the second app 215 whilst the apps 214, 215 are not controllable by the first computing entity 230. Where the second computing entity 240 only allows one set of such communications connections at a time, terminating or preventing the communication connections may allow for such communication connections to be established with the second computing entity 240 instead from an app 225 at the second DC 220, which, as described in more detail below, may facilitate effective failover of the second app 215 of the first DC 210. Further, where the further processing of the data should only be performed once, ceasing or preventing the further processing by the second app 215 may allow for such further processing to be performed instead by an app 225 at the second DC 220, which, as described in more detail below, may facilitate effective failover of the second app 215 of the first DC 210.

In this example, where the first app 214 is already executing at the first DC 210, operating the first app 214 in the disaster recovery mode may include ceasing the processing of data by the first app 214 and/or ceasing the routing of data by the first app 213 to the second app 215. Alternatively, where the first app 214 starts to execute after the determination is made, operating the first app 214 in the disaster recovery mode may include preventing the first app 214 from processing the data and/or preventing the first app 214 from routing the data to the second app 215. In either case, this stops the first app 214 from sending data to the second app 215, which, in turn, prevents the second app 215 further processing such data and sending the further processed data to the second computing entity 240, and hence prevents actions being taken by the second computing entity 240 based on the processing and/or routing performed by the first app 214 whilst the apps 214, 215 are not controllable by the first computing entity 230. Where the processing and/or routing of data should only be performed once, ceasing or preventing the processing or routing by the first app 214 may allow for such processing and/or routing to be performed instead by an app 224 at the second DC 220, which, as described in more detail below, may facilitate effective failover of the first app 214 of the first DC 210.

As another example, operating the first app 214 and/or the second app 215 in a disaster recovery mode may include shutting down the app 214, 215. For example, where the app 214, 215 is already executing at the first DC 210, operating the app in the disaster recovery mode may include shutting down the app 214, 215 to stop the functions of the app 214, 215 from being performed. Where the app 214, 215 is starting to execute at the first DC 210, operating the app in the disaster recovery mode may include shutting down the app 214, 215 before functions of the app 214, 215 are performed. This may help prevent any actions being taken by the second computing entity 240 based on the functions performed by the apps 214, 215 whilst the apps 214, 215 are not controllable by the first computing entity 230. Where the functions should only be performed once (that is, by one application), shutting down the app 214, 215 may allow for the functions to be performed instead by an app 224, 225 at the second DC 220, which, as described in more detail below, may facilitate effective failover of the apps 214, 215 of the first DC 210.

Turning now to the second DC 220, the second DC 220 may be in a different location to the first DC 210. For example, the second DC 220 may be in a different city or country to the first DC 210. The second DC 210 may be physically close to the third computing entity 250. In examples, the second computing system 221 may be co-located with the third computing entity 250 in the second DC 220. The second computing system 221 may be implemented by or otherwise include one or a plurality of the computing devices 100 described above with reference to FIG. 1. One or more of the third app 224, the fourth app 225, and the second monitor 222 may be implemented as software executed on one or more computing devices (for example, the computing device 100 described above with reference to FIG. 1) of the second computing system 211. For example, the third app 224, the fourth app 225, and the second monitor 222 may be executed on respective different computing devices (for example, the computing device 100 described above with reference to FIG. 1) of the second computing system 221, although it will be appreciated that this need not necessarily be the case and other configurations are possible.

The third app 224 and the fourth app 225 perform functions. In examples, the functions that the third app 224 and the fourth app 225 are configured to perform may be the same or similar to the functions that the first app 214 and the second app 215, respectively, are configured to perform. For example, the third app 224 and the fourth app 225 may be configured to perform the same or similar functions with respect to the third computing entity 250 as the first app 214 and the second app 215, respectively, are configured to perform with respect to the second computing entity 240. The third app 224 and the fourth app 225 are controllable by one or more computing entities external to the second DC 220. For example, the third app 224 and the fourth app 225 may be remotely controllable by the first computing entity 230.

As described in more detail below, in cases where the first app 214 and the second app 215 are no longer remotely controllable by the first computing entity 230, the third app 224 and/or the fourth app 225 of the second DC 220 may provide a failover of the first app 214 and/or the second app 215, respectively of the first DC 210. In examples, the third app 224 and/or the fourth app 225 may provide a failover of the first app 214 and/or the second app 215, respectively, by performing functions of the first app 214 and/or the second app 215, respectively, in addition to functions that the third app 224 and/or the fourth app 225 anyway perform. In other examples, the third app 224 and/or the fourth app 225 may start to execute at the second computing system 221 in order to provide a failover of the first app 214 and/or the second app 215, respectively.

The second monitor 222 is configured to obtain an indication that that the apps 214, 215 at the first DC 210 are no longer controllable by the first computing entity 230 external to the first DC 210. As described in more detail below with reference to FIG. 3, obtaining the indication that applications at the first DC 210 are no longer controllable by the first computing entity 230 may include the second monitor 222 determining that one or more communications connections between the first DC 210 and the second DC 220 have become inoperative. For example, the second monitor 222 may be configured to monitor a status of a set of one or more communications connections between the first DC 210 and the second DC 220 and one or more further sets of one or more communications connections between the first DC 210 and one or more further DCs (not shown in FIG. 2). The second monitor 222 may be configured to, based on one or more of these statuses, determine that the first DC 210 is no longer available to the first computing entity 230, and hence that the apps 214, 215 at the first DC 210 are no longer controllable by the first computing entity 230. In some examples, the second monitor 22 obtaining the indication that the apps 214, 215 at the first DC 210 are no longer controllable by the first computing entity 230 may include receiving a message, including data representing the indication, from a further computing entity (not shown in FIG. 2), such as a further DC (not shown in FIG. 2). For example, the further DC (not shown) may be responsible for determining that the apps 214, 215 at the first DC 210 are no longer controllable by the first computing entity 230 external to the first DC 210, and may, in response to this determination, send the message including the indication, to the second DC 220, specifically the second monitor 222 of the second DC 220. The second monitor 222 may receive this message and thereby obtain the indication.

The second monitor 222 is configured to determine, based on the obtained indication, that the second DC 220 is to provide a failover for the first DC 210. For example, as described in more detail below, the third app 224 and/or the fourth app 225 may provide a failover for the first app 214 and/or the second app 215, respectively. In examples, the determination by the second monitor 222 that the second DC 220 is to provide a failover for the first DC 210 may be responsive to the determination that the apps 214, 215 at the first DC 210 are no longer controllable by the first computing entity 230. This may allow for the time in which the failover is provided to be minimized. In examples, the determination that the second DC 220 is to provide a failover for the first DC 210 may include the second monitor 222 determining that the second DC 220 is the DC (among a plurality of further DCs, not shown in FIG. 2) that is designated to provide a failover for the first DC 210.

The second monitor 222 is configured to, in response to the determination that the second DC 220 is to provide a failover for the first DC 210, cause the third app 224 and/or the fourth app 225 at the second DC 220 to operate in a failover mode to provide a failover for the first app 214 and/or the second app 215, respectively, at the first DC 210. In examples, causing the app 224, 225 to operate in a failover mode may include causing an indication that the apps 224, 225 are to operate in a failover mode to provide a failover for apps 214, 215 of the first DC 210, to be communicated to the apps 224, 225. For example, this indication may be communicated by issuing a command to the apps 224, 225 that they are to operate in the failover mode. As another example, this indication may be communicated by transmitting a message, over the internal communications network 223, to the apps 224, 225, including data representing the indication. In examples, one or both of the apps 224, 225 may not be executing at the second DC 220 when the determination is made. In these examples, causing the app 224, 225 to operate in a failover mode may include issuing a command to start execution of the app 224, 225. In examples, the command and/or the message may include an indication of the identity of the first DC 210 for which the apps 224, 225 are to provide the failover.

The third app 224 and/or the fourth app 225 are configured to, in response to receiving the indication from the second monitor 222, operate in a failover mode to provide a failover for the first app 214 and/or the second app 215, respectively. For example, for the third app 224, operating in the failover mode may include performing one or more of the functions of the first app 214. For example, the third app 224 may perform the processing of data and/or routing of processed data otherwise performed by the first app 214. As another example, for the fourth app 225, operating in the failover mode may include performing one or more of the functions of the second app 215. For example, the fourth app 225 may establish communications connections with the second computing entity 240 otherwise established by the second app 215.

In some examples, the third app 224 and/or the fourth app 225 may query the database entity 260 to determine information relating to the operation of the first app 214 and/or the second app 215, respectively. The third app 224 and/or the fourth app 225 may use this information to perform the functions of, and hence provide a failover for, the first app 214 and/or the second app 215, respectively. For example, the third app 224 and/or the fourth app 225 may query the database entity 260 to determine information relating to the most recent operation of the first app 214 and/or the second app 215, respectively. For example, as mentioned above, the second app 215 of the first DC may have established a number of communications connections to the second computing entity 240 over the second communications network 262, but as part of the disaster recovery mode at the first DC 210, these communications connections may have been terminated by the second app 215. The fourth app 225, in order to provide a failover for the second app 215, may query the database entity 260 to determine information indicative of the communications connections that were (or should have been) established by the second app 215 with the second computing entity 240, and re-establishes these communication connections with the second computing entity 240 over the fourth communications network 264. As another example, as mentioned above, the first app 214 may process and output data, but as part of the disaster recover mode at the first DC 210, may no longer processes or output data. The third app 224, in order to provide a failover for the first app 215, may query the database entity 260 to determine information indicative of the most recent output of the first app 214. From this, the third app 224 may infer a state of the first app 215 when the first app 215 was shut down and may initiate the third app 224 in this state. The third app 224 may then process data based on this state, and hence continue to perform the function otherwise provided by the first app 214.

In some examples, the third app 224 and/or the fourth app 25 may perform one or more functions, in whole or in part, that are also performed by the first app 214 and/or the second app 215, respectively. In these examples, operating the third app 224 and/or the fourth app 225 in a failover mode may include activating the function. For example, under normal operation, the first app 214 may process first data and route the processed first data to the second app 215, which, however, may be ceased by operation in a disaster recovery mode. Under normal operation, the third app 224 may also processes the first data in the same way as the first app 214, but not route the processed first data to the fourth app 225. In these examples, operating the third app 224 in the failover mode may include activating the routing of the processed second data to the fourth app 225 by the third app 224. This may provide for a particularly fast failover of the functions of the first app 214 to the third app 224.

As described above, by the actions of the second monitor 22 and the apps 224, 225, the second DC 220 may provide a failover for the first DC 210. The apps 224, 225 of the second DC 220 are remotely controllable by the first computing entity 230. For example, the second DC 220 may communicate, to the first computing entity 230, over the sixth communication network 266, an indication that the second DC 220, specifically the apps 224, 225 thereof, are providing a failover for the first DC 210, specifically the apps 214, 215 thereof. The second DC 220 is available to the first computing entity 230, and hence the apps 224, 225 thereof are remotely controllable by the first computing entity 230. For example, whereas the first communications network 261 may be non-functional, and/or a component of the first DC 210 may be experiencing a failure or disaster that prevents the apps 214, 215 from being controlled by the first computing entity 230, the second communications network 266 and the second data center 220 may be functioning normally, allowing the failover apps 224, 225 at the second DC 220 to be remotely controlled by the first computing entity 230. Accordingly, functions of the apps 214, 215 of the first DC 210 may be continued, specifically by the apps 224, 225 of the second DC, in a way that is controllable by the first computing entity 230, even where the apps 214, 215 of the first DC 210 are no longer controllable by the first computing entity 230.

IV. Determining Data Center Availability

As described above, in some examples, obtaining the indication that the first DC 210 is no longer available to the first computing entity 230, and hence that applications at the first DC 210 are no longer controllable by the first computing entity 230, may include determining that one or more communications connections between the first DC 210 and one or more further DCs (such as the second DC 220) have become inoperative. An example way in which the indication is determined is described in more detail with reference to FIG. 3.

Figure 3:
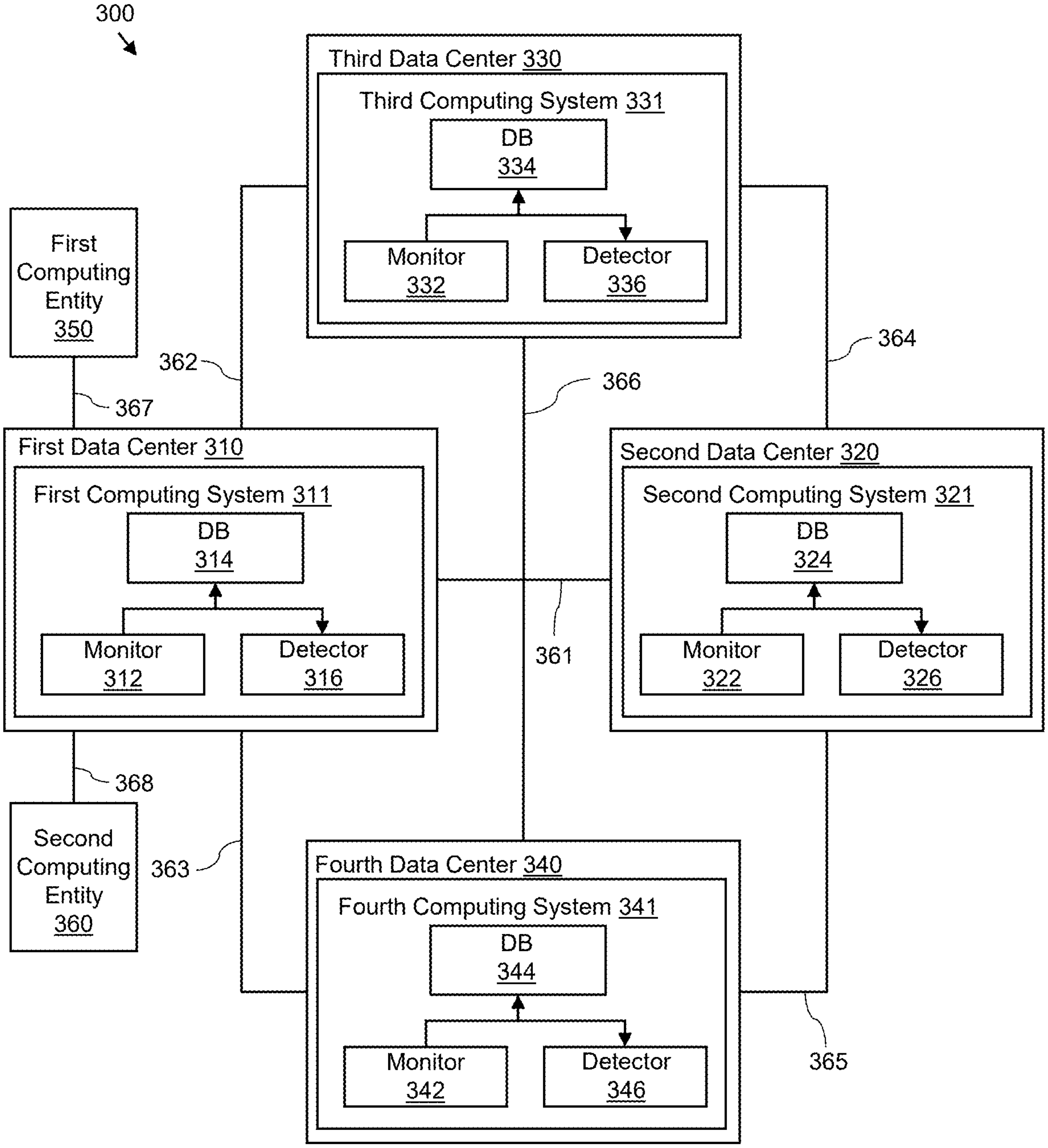
FIG. 3 illustrates a flow diagram of a method performed at a computing system of a first data center, DC, according to an example.

FIG. 3 is a block diagram showing a schematic representation of an example system 300. The system 300 includes a first data center, DC, 310, a second DC 320, a third DC 330 and a fourth DC 340. The first DC 310 of FIG. 3 may be the first DC 210 described above with reference to FIG. 2. Further, the second DC 320 may be the second DC 220 described above with reference to FIG. 2. In FIG. 3, the DCs 310, 320, 330, 340 are communicably connected to one another via respective networks. Specifically, the first DC 310 and the second DC 320 are communicably connected via a first network 361; the first DC 310 and the third DC 330 are communicably connected via a second network 362; the first DC 320 and the fourth DC 340 are communicably connected via a third network 363; the second DC 320 and the third DC 330 are communicably connected via a fourth network 364; the second DC 320 and the fourth DC 340 are communicably connected via a fifth network 365; and the third DC 330 and the fourth DC 340 are communicably connected via a sixth network 366. The DCs 210, 220, 230, 240 may be in different locations to one another, for example, in different cities or countries. The system 300 may, in some examples, be one of multiple such systems. For example, the system 300 may be located in a first geographical region and further similar systems may be provided in further geographical regions.

Each of the DCs 310, 320, 330, 340 includes a respective computing system which includes components which maintain and monitor communications between the DCs 310, 320, 330, 340. Namely, the first DC 310 includes a first computing system 311 which includes a first monitor 312, a first database 314 and a first detector 316. The first computing system 311, may be the first computing system 211 of the first DC 210 described above with reference to FIG. 2. The first database 314 may be the database 216 of the first computing system 211 described above with reference to FIG. 2. The first monitor 312 and the first detector 316 may be provided as functions of the first monitor 212 described above with reference to FIG. 2. The second DC 320 includes a second computing system 321 which includes a second monitor 322, a second database 324, and a second detector 326. The second computing system 331, may be the second computing system 221 of the second DC 220 described above with reference to FIG. 2. The second database 324 may be the database 226 of the second computing system 221 described above with reference to FIG. 2. The second monitor 322 and the second detector 326 may be provided as functions of the second monitor 222 described above with reference to FIG. 2. The third DC 330 includes a third computing system 331 which includes a third monitor 332, a third database 334, and a third detector 336. The fourth DC 340 includes a fourth computing system 341 which includes a fourth monitor 342, a fourth database 344, and a fourth detector 346. One or both of the third DC 330 and the fourth DC 340 may be the same or similar to one or both of the first DC 210 and the second DC 220 described above with reference to FIG. 2. The first monitor 212 is communicably connected to the first database 314, and to the first detector 316, for example, via a local area network. The components within each of the second, third and fourth computing systems 321, 331, 341 are connected in a similar manner.

The system also includes a first computing entity 350 and a second computing entity 360. The first computing entity 350 may be the first computing entity 230 described above with reference to FIG. 2. The second computing entity 360 may be the second computing entity 240 described above with reference to FIG. 2. The first computing entity 350 and the second computing entity 360 are communicably connected to the first DC 310 via respectively, a seventh network 367 and an eighth network 368. In examples, one or more of the first to eighth communications networks 361-368 may include one or more of a local area network, a wide area network, a multicast network, a wireless network, a virtual private network, an internal network, a cellular network, a peer-to-peer network, a point-of-presence, a dedicated line, the Internet, a shared memory system, and/or a proprietary network. One or more of the first to eighth communications networks 361-368 may be different, in whole or in part, from one another or may be the same network.

In the system 300 of FIG. 3, each of the monitors 312, 322, 332, 342 is configured to maintain and monitor a respective set of communications connections between itself and each of the other monitors 312, 322, 332, 342, which may be referred to herein as its peers. Each set of communications connections allows the transmission of information from a monitor of one of the DCs 310, 320, 330, 340 to a monitor of the another of the DCs 310, 320, 330, 340 over the respective network that connects the two DCs. For example, a set of communications connections allows information to be transmitted from the first monitor 312 to the second monitor 322 via the first network 361. A different set of communications connections allows information to be transmitted from the second monitor 322 to the first monitor 312 via the first network 361. Similarly, another set of communications connections allows information to be transmitted from the first monitor 312 to the third monitor 332 via the second network 362, and a different set of communications connections allows information to be transmitted from the third monitor 332 to the first monitor 312 via the second network 362. Similarly, again, another set of communications connections allows information to be transmitted from the first monitor 312 to the fourth monitor 342 via the third network 363, and a different set of communications connections allows information to be transmitted from the fourth monitor 342 to the first monitor 312 via the third network 363.

Each set of communications connections may include multiple communications connections which may be of the same type or a different type to one another. As an example, a particular set of communications connections may include two communications connections using a different protocol to one another, for example, a UDP connection and a TCP connection. Additionally, or alternatively, each communications connection in a set of communications connections may be transmitted over separate paths, for example, over separate VLANs.

In one example, each of the sets of communications connections which allows information to be transmitted from one of the monitors 312, 322, 332, 342 to a particular one of its peers includes a first communications connection for transmitting heartbeats. As an example, each monitor 312, 322, 332, 342 may transmit heartbeats over a respective multicast channel. Each monitor 312, 322, 332, 342 may also subscribe to the respective multicast channels of each of its peers to receive heartbeats from its peers. Each subscription by a monitor 312, 322, 332, 342 to a multicast channel of one of its peers may be considered to be a first communications channel for the transmission of information from the monitor 312, 322, 332, 342 transmitting the heartbeats to the monitor 312, 322, 332, 342 which is subscribed to receive the heartbeats. For example, each subscription by the second, third and fourth monitors 322, 332, 342 to the multicast channel on which the first monitor 312 transmits its heartbeats may be considered to be a respective first communications connection from the first monitor 312. Each multicast channel may be made via UDP, for example, using Latency Busters Messaging (LBM). For example, each monitor 312, 322, 332, 342 may transmit its heartbeats using a unique LBM topic and may subscribe to the topics of the its peers to receive their heartbeats. Heartbeats may be transmitted by each of the monitors 312, 322, 332, 342 periodically. For example, each monitor 312, 322, 332, 342 may multicast a heartbeat at regular intervals, for example, of 1 minute, 30 seconds, 20 seconds, 10 seconds or 5 seconds.

On receiving a heartbeat from one of its peers, each of the monitors 312, 322, 332, 342 is configured to record receipt of the heartbeat and a timestamp for the receipt of the heartbeat in a particular location in its respective database. Considering, as an example, the operation of the first monitor 312 in this regard, the first monitor 312 is configured to receive, via subscriptions to respective multicast channels, second heartbeats from the second monitor 322, third heartbeats from the third monitor 332 and fourth heartbeats from the fourth monitor 342. Responsive to receiving a second heartbeat from the second monitor 322, the first monitor 312 records the receipt of the second heartbeat and a timestamp for the received second heartbeat at a particular location, associated with the second monitor 322, in the first database 314. The first monitor 312 may store the timestamp of the last received heartbeat from the second monitor 322 in the location. The first monitor 312 may similarly record, in respective locations the first database 314, a record of receipt and a timestamp for receipt of third heartbeats from the third monitor 332 and fourth heartbeats from the fourth monitor 342. The second monitor 322, third monitor 332 and the fourth monitor 342 operate in a similar manner to record the receipt of heartbeats from their peers in their respective databases 322, 334, 344. As will be described in more detail below, each detector 316, 326, 336, 346 is configured to determine a status of the first communications connections of its associated monitor to its peers based on the record of the receipt of heartbeats from the peers.

In some examples, each of the sets of communications connections which allows information to be transmitted from one of the monitors 312, 322, 332, 342 to a particular one of its peers also includes a respective second communications connection. Each second communications connection allows a particular one of the monitors 312, 322, 332, 342 to inspect a location at a particular one of its peers, for example, a location in the database associated with that peer. For example, a second communications connection from the first monitor 312 to the second monitor 322 may allow the first monitor 312 to inspect a location in the second database 324. The second communications connection may be a read-only connection. The second communications connections may, for example, each include a TCP connection between the monitors.

Each monitor 312, 322, 332, 342 is configured to write into its database 314, 324, 334, 344 an indication of whether it is able to inspect a respective location in the databases of each of its peers. For example, the first monitor 312 is configured to monitor the status of the second communications connection from the second monitor 322 to the first monitor 312 by (for example, periodically) attempting to inspect a particular location at the second database 324. This inspection may include a read-only operation performed by the first monitor 312. If the first monitor 312 is able to inspect the location in the second database 324, then the first monitor 312 writes an indication that it is able to inspect the location to the first database 314 at a location in the first database 3214 associated with the second monitor 322. However, if the first monitor 312 is unable to read the location in the second database 324 then the first monitor 312 writes to the first database 314 an indication that it is unable to inspect the location. The first monitor 312 similarly determines whether it is able to inspect the locations in the third database 334 and the fourth database 344 and writes indications of the results of these attempted inspections to respective locations associated with the third monitor 332 and the fourth monitor 342 in the first database 314. Each of the second, third and fourth monitors 322, 332, 342 operate in a similar manner to monitor and record whether they are able to inspect the relevant locations in the databases of their peers. Accordingly, each monitor 312, 322, 332, 342 records in its associated database 314, 324, 334, 344 the readability of the locations in the databases of its peers from its own point of view.

In an example, the databases 314, 324, 334, 344 each store data at locations identified by respective paths. For example, similar to a file system, the path of a particular location may be made up of a hierarchical sequence of path elements. Accordingly, data may be written to or read from a specific path in a given one of the databases 314, 324, 334, 344. Each monitor 312, 322, 332, 342 may maintain its own set of locations, stored in its associated database 314, 324, 334, 344. Each monitor 312, 322, 332, 342 may place a watch on respective particular locations in the databases of its peers, and write to a corresponding location in its own database that the connection to a particular remains operative while the watch is not triggered. If the location at the database of one of its peers becomes unreadable then the monitor may receive a notification of the same via the watch. The monitor then writes to a particular location in the set of locations in its database that the connection to that particular peer is inoperative. The locations in which each given monitor records the receipt of heartbeats from its peers may also be a part of the same set of locations. For example, in the first database 314 there may be, to record the statuses of the connections from the second monitor 322 to the first monitor 312, a first location at which the time of receipt of the latest heartbeat from the second monitor 322 is recorded and a second location at which the readability of the second database 324 according to the first monitor 312 is recorded. There may also be in the first database 314 first and second locations for recording the statuses of each of the third monitor 332 and the fourth monitor 342 to the first monitor 312. There may be a similar set of locations in each of the second, third and fourth databases 324, 334, 344 for recording the statuses of the communications connections between the second, third and fourth monitors 322, 332, 342 and their respective peers.

The information stored in the database of a particular DC 310, 320, 330, 340 may be used to determine the status of communications connections between DCs. As will be described below in more detail, this information may be used to determine the availability of a particular DC. For example, the availability of the first DC 310 to one or more computing entities external to the first DC 210, such as the first computing entity 350, may be determined.

In one such example, the first detector 316 is configured to determine the status of the set of communications connections from the second monitor 322 to the first monitor 312 based on the information stored in the first database 314 regarding: the first communications connection over which the second monitor 322 transmits heartbeats to the first monitor 312; and the second communications connection via which the first monitor 312 can inspect the relevant location in the second database 324.

Regarding the first communications connection, the first detector 316 is configured to determine that the first communications connection from the second monitor 322 is inoperative if a heartbeat has not been received by the first monitor 312 from the second monitor 322 for a pre-determined period, which may be referred to as a timeout threshold. The timeout threshold may, for example, be set as an integer multiple of the expected period between the transmission of heartbeats by the second monitor 322. Accordingly, the timeout threshold may be determined to be exceeded if a pre-determined number of successive heartbeats, for example, one, two, three, or four or more successive heartbeats, are not received from the second monitor 322. This determination may be based on the timestamp of the latest heartbeat received and the expected period between heartbeats. In one example, the timeout threshold applied by the first detector 316 to heartbeats from the second monitor 322 is three heartbeat periods and the period between the expected transmission of heartbeats is 30 seconds, making the timeout threshold 90 seconds. If 90 seconds elapse without receipt of a heartbeat from the second monitor 322, the first detector 216 determines that the first communications connection is inoperative. Otherwise, if at least one heartbeat from the second monitor 322 has been received before the timeout period elapses, the first detector 316 determines that the first communications connection from the second monitor 322 remains operative. In some examples, a result of the determination of the status of the first communications connection is written to the first database 314.

The first detector 316 is configured to determine the status of the second communications channel from the second monitor 322 to the first monitor 312 based on the information stored in the first database 314 regarding whether the first monitor 312 is able to inspect the respective location in the second database 324. In some examples, a result of the determination of the status of the second communications connection is written to the first database 314.

The detector 316 is configured to use the determined statuses of the first communications channel and the second communications channel from the second monitor 322 to the first monitor 312 to determine the overall status of the set of communications channels from the second monitor 322 to the first monitor 312. Namely, if both the first communication channel and the second communications channel are inoperative, then the overall status of the set of communications channels is determined as inoperative. This provides an indication, from the point of view of the first DC 310, that it is no longer able to receive communications from the second DC 320. If, however, only one of the first communications channel and the second communications channel is determined to be inoperative, the first detector 316 determines the overall status of the set of communications channels to be operative.

In a similar manner to that described above for the set of communications connections from the second monitor 322 to the first monitor 312, the first detector 316 is configured to determine a status of a set of communications connections from the third monitor 332 to the first monitor 312, and a status of a set of communications connections from the fourth monitor 342 to the first monitor 312.

The first detector 316 is configured to then determine, based on the determined respective statuses of the sets of communications connections from the second, third and fourth monitors 322, 332, 342 to the first monitor 312, the availability of the first DC 310. The first detector 316 may determine that the first DC 310 is unavailable if all of the sets of communications connections over which it is configured to receive information from its peers are inoperative. Specifically, the first detector 316 may determine that the first DC 310 is unavailable if the first detector 316 determines that: the time elapsed since the first monitor 312 has received a heartbeat from the second monitor 322 exceeds the timeout threshold, and the first monitor 312 is unable to inspect the location at the second database 324; the time elapsed since the first monitor 312 has received a heartbeat from the third monitor 232 exceeds the timeout threshold, and the first monitor 312 is unable to inspect the location at the third database 334; and the time elapsed since the first monitor 312 has received a heartbeat from the fourth monitor 342 exceeds the timeout threshold, and the first monitor 312 is unable to inspect the location at the fourth database 344.

If, however, at least one of the respective sets of communications connections to the second, third and fourth monitors 322, 332, 342 remains operative, then the first detector 316 determines that the first DC 310 remains available. As such, if there is an indication that the first DC 310 remains in communication with at least one of the other DCs 320, 330, 340, then it is determined that the first DC 310 is available, and hence that applications (not shown in FIG. 3) of the first DC 310 are controllable by one or more computing entities external to the first DC 310, such as the first computing entity 350. A determination by the first detector 316 that the first DC 310 is unavailable may result from a complete loss of communications from the second, third and fourth DCs 320, 330, 340 to the first DC 310. This may occur, for example, because of a software or hardware malfunction at the first DC 310 which nevertheless allows functionality at the first DC 310, including the first detector 316, to remain operational. By basing the determination of the availability of the first DC 310 on an indication of the status of communications from the first DC 310 to all of its peers, a robust and reliable determination of the availability can be made. For example, determining that the first DC 310 is unavailable only when an indication is determined that communication to all of the peer DCs 320, 330, 340 has been lost, the risk of a false determination that the first DC 310 is unavailable may be mitigated. For example, the risk of falsely determining the first DC 310 to be unavailable based on the loss of a particular communications channel may be mitigated.

According to certain examples described herein the detection by the first detector 316 that the first DC 310 is unavailable may be automatic, and, therefore, may be obtained quickly and in an efficient manner. This automatic determination that the first DC 310 is unavailable, and hence that applications (not shown in FIG. 3) are no longer controllable by one or more entities external to the first DC 310, also allows for the first DC 310 to be notified of this fact in a circumstance where communication between the first DC 310 and external entities has broken down. Accordingly, action can be taken quickly and efficiently at the first DC 310 without, for example, the need for a command from an entity external to the first DC 310 or for manual intervention at the first DC 310.

In some circumstances, the first DC 310 may become unavailable, for example, because of a loss of power to the first DC 310 or hardware failure at the first DC 310, in a manner which results in the first computing system 311 not remaining operational. In such examples, the first DC 310 may be unable to determine its own unavailability. However, in such examples, it may also be unnecessary for action to be taken at the first DC 310 to shut down or modify functionality at the first DC 310, since this functionality may no longer be operational.

In some examples, in addition to the availability of the first DC 310 being determined at the first DC 210, by the first computing system 311, the availability of the first DC 210 may be determined at one or more of the other DCs 320, 330, 340. In one such example, the third computing system 331 at the third DC 330 is configured to monitor the availability of the first DC 310. In this example, the third detector 336 is configured to monitor the statuses of respective sets of communications connections for the transmission of information from the first monitor 312 to the other monitors 322, 332, 342. If the third detector 336 determines that all of the sets of communications connections from the first monitor 312 to its peers are inoperative, then the third monitor 232 determines that the first DC 310 is unavailable.

In more detail, in this example, the third monitor 332 is configured to receive heartbeats from the first monitor 312 over a first communications channel via the second network 362. These heartbeats are recorded in the third database 334, as described above, and, in the manner described above for the first detector 316, the third detector 236 is configured to detect when the first communications channel carrying heartbeats from the first monitor 312 to the third monitor 332 becomes inoperative, by determining when the timeout threshold is exceeded. The third monitor 332 also is configured to record in the second database 324 the readability of a location in the first database 314 via a second, read-only, communications connection which allows the third monitor 332 to inspect the location in the first database 314. The third detector 336 is configured to use this information stored in the third database 334 by the third monitor 332 to determine the overall status of the set of communications channels over which the third monitor 332 is configured to receive information from the first monitor 212.

As has also been described above, the second monitor 322 and the fourth monitor 342 are also configured to receive heartbeats from the first monitor 312 over respective first communications channels and to record the receipt of these heartbeats in their respective databases 324, 344. Similarly, the second monitor 322 and the fourth monitor 342 are configured to record in their respective databases 324, 344 an indication of whether they are able to inspect a location in the first database 314. To determine the respective statuses of the sets of communications connections from the first monitor 312 to the second monitor 322 and from the first monitor 312 and the fourth monitor 342, the third monitor 332 is configured to access these records in the second and fourth databases 324, 344.

In an example, the third monitor 332 obtains, from the second database 324, the record of heartbeats received by the second monitor 322 from the first monitor 312. The third monitor 332 also obtains, from the second database 324, the record of whether the location in the first database 314 is readable according to the second monitor 332. The third monitor 332 may store the information obtained from the second monitor 322 regarding its set of connections to the first monitor 312 in the third database 334. Based on this information, the third detector 336 then determines the status of the set of communications connections from the first monitor 312 to the second monitor 322. Similarly, in this example, the third monitor 332 obtains, from the fourth database 332, the record of heartbeats received by the fourth monitor 342 from the first monitor 312 and the record of whether the location in the first database 314 is readable according to the fourth monitor 332. The third monitor 332 stores this information in the third database 334. The third detector 336, based on this information, may then determine the status of the set of communications connections from the first monitor 312 to the fourth monitor 332.

Based on the determination of the statuses of the respective sets of communications connections from the first monitor 312 to the second, third and fourth monitors 322, 332, 342, the third detector 336 determines the availability of the first DC 310. Similarly to the manner described above in which the first detector 316 may determine the availability of the first DC 310, the third detector 336, in examples, determines that the first DC 310 is unavailable only if it determines that all of the sets of communications connections between the first monitor 312 and its peers are inoperative.

Responsive to the third detector 336 determining that the first DC 310 is unavailable, one or more actions may be taken at the third DC 330. Such actions may be taken, for example, by the third monitor 332. In one example, such an action may involve initiating failover of functionality of the first DC 310 to a failover DC, for example, the second DC 320. In one such example, the third monitor 332 initiates failover of the functionality of the first DC 310 to the second DC 220 by sending a message to the second monitor 322.

The message may include an indication that the first DC 310 has become unavailable, and hence that the applications at the first DC 310 are no longer controllable by one or more entities external to the first DC 310. Accordingly, the second monitor 322 may obtain the indication that the first DC 310 has become unavailable, and hence that the applications at the first DC 310 are no longer controllable by one or more entities external to the first DC 310. In examples, as described above, the second monitor 322 may determine, based on this indication, that the second DC is to provide a failover for the first DC 310. In examples, the message may instruct the second monitor 322 that the second DC 320 is to provide a failover for the first DC 310, for example to provide a failover for (that is, take over) certain functionality which was being performed by the first DC 310. This message may allow the second DC 320 to quickly receive an indication that the first DC 310 is unavailable and begin taking over the relevant functionality from the first DC 310, for example as described above.

As an alternative to the automatic failing over of functionality of the first DC 310 to another DC, failover from the first DC 310 may be handled manually. For example, the third monitor 332 may, responsive to determining that the first DC 310 is unavailable, issue an alert. Responsive to receipt of such an alert, a user may manually initiate a failover procedure for failing over the functionality of the first DC 310, for example, to the second DC 320. For example, the manual initiation may include sending a message to the second DC 320 indicating that the first DC 210 has become unavailable. The second DC 320 may then initiate the failover based on this message.

In examples, the second DC itself may determine the availability of the first DC. For example, in a similar way to as described above for the third DC 330, the second detector 326 of the second DC 320 may determine the availability of the first DC 310 based on the determination of the statuses of the respective sets of communications connections from the first monitor 312 to the second, third and fourth monitors 322, 332, 342. For example, the second detector 326 may determine that the first DC 310 is unavailable only if it determines that all of the sets of communications connections between the first monitor 312 and its peers are inoperative. By the second detector 326 determining the unavailability of the first DC 310, the second computing system 321 of the second DC 320 may thereby obtain the indication that the first applications at the first DC 310 are no longer controllable by one or more entities 350 external to the first DC 310. Based on the indication, the second DC 320 may provide a failover for one or more of the first applications at the first DC 310, for example as described above.

In examples, redundancy of the above-described functionality of the third DC 330 may be provided by one or more further DCs, such as the fourth DC 340. For example, as described above, the third detector 336 may determine the availability of the first DC 310, and in response to determining that the first DC 310 is unavailable, take one or more actions such as initiating failover of functionality of the first DC 310 to a failover DC, for example, the second DC 320. However, in examples, a further DC such as the fourth DC 340 may, in a similar way to as described above for the third DC 330, determine the availability of the first DC 310. For example, the fourth detector 346 and the fourth monitor 342 may act to determine the availability of the first DC 310, in a similar manner to that described above for the third monitor 332 and the third detector 336. In such cases, in response to determining that the first DC 310 is unavailable, the further DC may take one or more actions such as initiating failover of functionality of the first DC 310 to a failover DC, for example, the second DC 320. This redundancy may ensure that, in cases where the third DC 330 becomes unavailable, the unavailability of the first DC 310 may nonetheless be detected, and appropriate action taken in response, such as initiating failover of the first DC 310 to the second DC 320.

In examples, the further DC, such as the fourth DC 340, may provide the above-mentioned functionality of the third DC 330 in response to a determination that the third DC 330 has become unavailable. In these cases, the availability determination and failover initiation functionality of the third DC 330 may be failed over to the further DC, such as the fourth DC 340. This may enable this functionality to be provided even where the third DC 330 has become unavailable. The availability of the third DC 330 may be determined in any suitable manner, including using the techniques described above with reference to FIG. 3. For example, the fourth DC 340 may determine the availability of the third DC 330 in the same or similar way as the third DC 330 determines the availability of the first DC 310 as described above. As another example, the third DC 330 may also be part of a further plurality of DCs (not shown) that includes another further DC (not shown) that determines the availability of the third DC 330 and initiates failover of the above-described functionality of the third DC 330 to the fourth DC 340. This other further DC may determine the availability of the third DC 330 and initiate failover of the functionality of the third DC 330 to the fourth DC 340 in a similar manner to that described above by which the third DC 330 determines the availability of the first DC 310 and initiates failover of functionality of the first DC 310 to the second DC 320.

In examples, the third DC 330 may form a part of cloud computing resources provided in a first geographical region, and the further DC, such as the fourth DC 340, may form a part of cloud computing resources provided in a second, different, geographical region. The first and second geographical regions may, for example, be different parts of a country or continent or different countries or continents. This may provide that if the cloud computing resources in the first geographical region become unavailable the above-described functionality of the third DC 330 can be failed over to the further DC, such as the fourth DC 340, of the cloud computing resources in the second geographical region. Cloud computing resources in the second geographical region may be relatively isolated from factors that may cause unavailability of the cloud computing resources in the first geographical region, such as regional power or communications failures. For example, cloud computing resources provided in the different geographical regions may be provided by independent infrastructure. This may allow for improved reliability for the functionality intended to be provided by the third DC 330.

V. Variations

In the example system 200 described above with reference to FIG. 2, the first DC 210 has two apps 214, 215. However, it will be appreciated that this need not necessarily be the case and the first DC 210 may any number of apps, that is, one or more apps. In the examples system 200, the apps 214, 215 are remotely controllable by the first computing entity 230. However, it will be appreciated that one or more of the apps may be remotely controllable by any one or more computing entities external to the first DC 210, of which the first computing entity 230 is an example. In the example system 200, the first monitor 212 obtains the indication that the one or more apps 214, 215 are no longer remotely controllable by the one or more external computing entities 230, determines that the apps 214, 215 are to operate in a disaster recovery mode, and causes the indication to operate in a disaster recovery mode to be communicated to the apps 214, 215. However, it will be appreciated that this need not necessarily be the case, and that more generally the computing system 211, or any component thereof, may perform these functions.

In the example system 200, the indication is communicated to the apps 214, 216 using the shared library 217 and by messaging over the internal communications network 214, 215. However, it will be appreciated that this need not necessarily be the case, and that in other examples one or the other may be used. Further, in some examples, other ways of causing the indication to be communicated to the apps 214, 215 may be used instead. As one example, the apps 214, 215, rather than the shared library 217, may be configured to subscribe to receive callbacks from the DB 216, specifically from the DR path of the DB 216. In this case, when the first monitor 212 writes the data representing the indication to the DR path of DB 216, the DB 216 may send a callback to each app 214, 215. Each app 214, 215 may be configured to operate in the disaster recovery mode in response to receiving a callback indicating that the apps 214, 215 are to operate in a disaster recovery mode. As another example, each app 214, 215 may be configured to refer directed to the DR path of the DB 216, for example when starting to execute at the first DC 210 or during execution of the app at the first DC 210, for example periodically. In this case, the DR path of the DB 216 is an example of a location in storage which applications may be configured to access. In this case, each app 214, 215 may be configured to access this location in memory and read the data written there. If the data indicates that the apps 214, 215 are to operate in a DR mode, then the apps 214, 215. Other configurations are possible.

In the example system 200, the second DC 220 has two apps 224, 225. However, it will be appreciated that this need not necessarily be the case and the second DC 220 may any number of apps, that is, one or more apps 224, 225. Further, while in the example system 200 it is described that the third app 224 provides a failover for the first app 215 and the fourth app 225 provides a failover for the second app 225, it will be appreciated that this need not necessarily be the case, and more generally, one or more apps 224, 225 of the second DC 220 may provide a failover for one or more apps 214, 215 of the first DC 210. In the example system 200, the second monitor 222 obtains the indication that the one or more apps 214, 215 are no longer remotely controllable by the one or more external computing entities 230, determines that the second DC 220 is to provide a failover for the first DC 210, and causes one or more apps 224, 225 to operate in a failover mode. However, it will be appreciated that this need not necessarily be the case, and that more generally the computing system 221, or any component thereof, may perform these functions.

In the example system 300 described above with reference to FIG. 3, the system 300 includes four DCs 310, 320, 330, 340. However, this need not necessarily be the case, and another example system which operates in a similar manner may include fewer DCs, such as three DCs or two DCs, or more than four DCs. For example, the fourth DC 340 may be omitted from the system 300. In such an example, the availability of the first DC 310 may be determined in a similar manner to that described above, except being based on the respective statuses of sets of communications connections between the first DC 310, the second DC 320 and the third DC 330. In such examples, the first detector 316 may determine that the first DC 310 is unavailable to the one or more computing entities external to the first DC 310 if both the respective sets of communications connections from the second monitor 322 to the first monitor 312 and from the third monitor 232 to the first monitor 312 are inoperative. Similarly, the third detector 336, or the second detector 326, may determine that the first DC 310 has become unavailable based on respective statuses of sets of communications connections from the first monitor 312 to the second monitor 322 and from the first monitor 312 to the third monitor 332. The third detector 336 or the second detector 326 may determine the respective statuses of these sets of communications connections from the first monitor 312 in the same manner as described above. In such examples, the third detector 336 or the second detector 326 may be configured to determine that the first DC 310 is unavailable to the one or more computing entities external to the first DC 310 if both the sets of communications connections from the first monitor 312 to the second monitor 322 and from the first monitor 312 to the third monitor 332 are inoperative. As another example, the fourth DC 340 and the third DC 330 may be omitted from the system 300. In such examples, the first detector 316 may determine that the first DC 310 is unavailable to the one or more computing entities external to the first DC 310 if the sets of communications connections from the second monitor 322 to the first monitor 312 are inoperative. Similarly, the second detector 326, may determine that the first DC 310 has become unavailable based on statuses of sets of communications connections from the first monitor 312 to the second monitor 322. The second detector 326 may determine the statuses of these sets of communications connections from the first monitor 312 in the same manner as described above. In such examples, the second detector 326 may be configured to determine that the first DC 310 is unavailable to the one or more computing entities external to the first DC 310 if the sets of communications connections from the first monitor 312 to the second monitor 322 are inoperative.

In the example system 300, each of the sets of communications connections which allows one of the monitors 312, 322, 332, 342 to transmit information to another of the monitors 312, 322, 332, 342 includes a first communications connection and a second communications connection, which are of different types to one another. However, this need not necessarily be the case, and, for example, the sets of communications connections may each include only one communications connection, or may include more than two communications connections. Further, the sets of communications connections may include the same or different numbers of communications connections to one another. Moreover, the communications connections of a particular set of communications connections may include more than one communications connection of the same type. For example, a set of communications connections for transmitting information from one of the monitors 312, 322, 332, 342 to another of the monitors 312, 322, 332, 342 may include a first communications connection for transmitting first heartbeats and a second communications connection for transmitting second heartbeats. In such an example, the first communications connection and the second communications connection may, for example, be transmitted over separate paths, for example, over separate VLANs.

In the example system 300, for the third detector 336 to determine the availability of the first DC 310, the third monitor 334 is configured to obtain information from the second database 324 regarding the first and second communications connections from the first monitor 312 to the second monitor 322 and from the fourth database 344 regarding the first and second communications connections from the first monitor 312 to the fourth monitor 342. The third detector 326 may then determine the overall statuses of the respective sets of communications connections from the first monitor 312 to the second monitor 322 and from the first monitor 312 to the fourth monitor 342. However, this need not necessarily be the case, and, instead, one or more of the statuses of these sets of communications connections may be determined at the second DC 320 or the fourth DC 340 and communicated to the third monitor 332. For example, the second detector 326 may be configured to determine an overall status of the set of communications connections from the first monitor 312 to the second monitor 322. This status may be stored in the second database 324 and accessed by the third computing system 231, for example, by the third monitor 232. Similarly, the fourth detector 246 may be configured to determine an overall status of the set of communications connections from the first monitor 212 to the fourth monitor 242. This status may be stored in the fourth database 244 and accessed by the third computing system, again, for example, by the third monitor 232. This variation may also apply to examples where the second DC 320 determines the availability of the first DC 310 instead of or in addition to the third DC 330.

In certain examples of the system 300 described above the third computing system 331 may act as a DC coordinator by determining the availability of the first DC 310 and/or availabilities of the other DCs 320, 340. However, this need not necessarily be the case and, for example, the second computing system 321 or the fourth computing system 341 may instead act as such a coordinator by monitoring the availability of the first DC 310 and, for example, taking action such as initiating failover to another DC, such as the second DC 320, when the first DC 210 becomes unavailable. For example, as described above, the fourth computing system 341 may act as such a coordinator in response to a determination that the third DC 330 has become unavailable, in order to provide a failover for the coordinator functionality of the third computing system 331 of the third DC 330. In other examples, none of the DCs 320, 330, 340 may perform such a coordinator role and, for example, instead, the DCs 320, 330, 340 may communicate with one another to determine and agree on the availability of the first DC 310 and any action to take in response to the first DC 310 becoming unavailable.

In the example system 300, particular functionality of the determining of the availability of a DC is performed by particular components of the computing systems 311, 321, 331, 341. For example, the monitors 312, 322, 332, 342 maintain the respective sets of communications connections with one another and the detectors 316, 326, 336, 346 are configured to make the determination of the availability of a particular data center. However, this need not necessarily be the case, and, more generally, the functions involved in determining the availability of a data center and, for example, taking any action in response to determining that a data center is unavailable, may be performed by the computing systems 311, 321, 331, 341, or any component thereof.

VI. Example Methods

Figure 4:
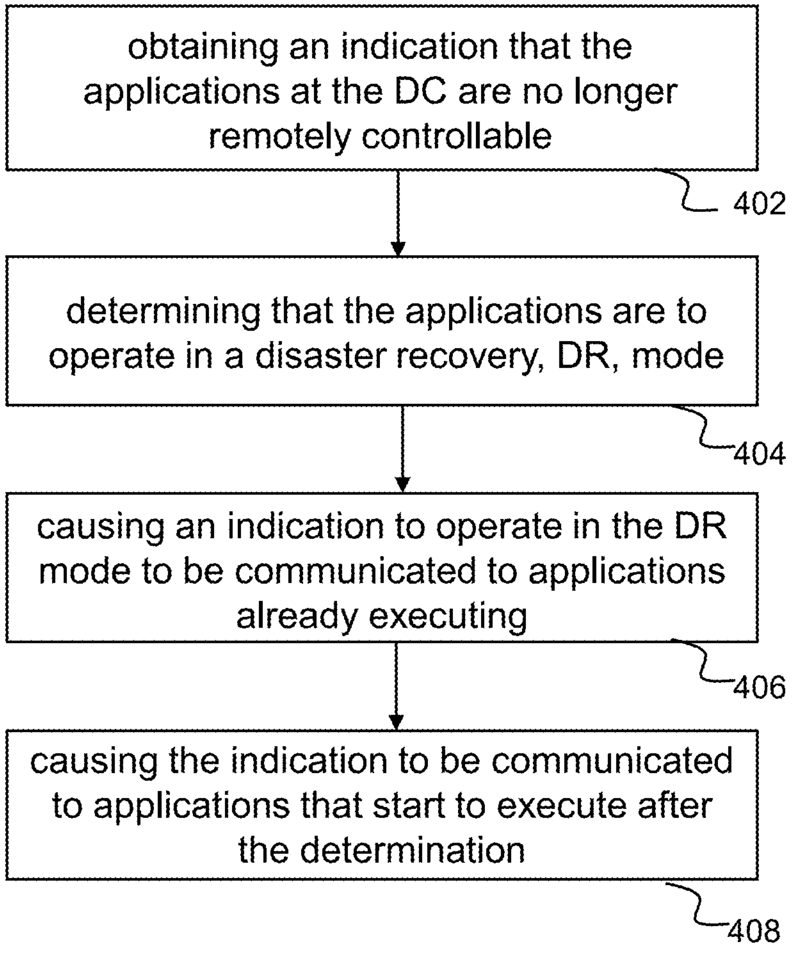
FIG. 4 illustrates a flow diagram of a method performed at one or more applications of the first DC, according to an example.

Referring to FIG. 4, there is a flow diagram illustrating a method according to an example. The method may be performed by a computing system, for example the first computing system 211, 311 according to any of the examples described above with reference to FIG. 1 to FIG. 3. In examples, the computing system includes a processor (for example, the processor 112 of FIG. 1) and a memory (for example, the memory 114 of FIG. 1). The method may be performed by the processor. The processor may be configured to perform the method. The memory may store instructions which, when executed, cause at least one processor (for example, the processor 112 of FIG. 1) of a computing system to perform the method, or functions defined by the method. For example, the memory may store an application (for example, the application 130 of FIG. 1) including the instructions. The method is for controlling applications at a data center, for example the apps 214, 215 at the first DC 210 of any of the examples described above with reference to FIG. 1 to FIG. 3. The applications are controllable by one or more computing entities external to the DC, for example the first computing entity 230, 350 according to any of the examples described above with reference to FIG. 2 to FIG. 3.

The method includes, in step 402, obtaining an indication that the applications at the DC are no longer controllable by the one or more computing entities external to the DC. For example, this may include determining that one or more communications connections between the DC and one or more further DCs have become inoperative, as described above.

The method includes, in step 404, determining, based on the indication, that the applications at the DC are to operate in a disaster recovery mode. For example, the determination may be made responsive to obtaining the indication, as described above. In examples, depending on the application, operating in the disaster recovery mode may include ceasing or stopping one or more functions performed by the application and/or preventing the application from performing one or more functions, as described above.

The method includes, in step 406, in response to the determination, causing an indication that the applications at the DC are to operate in the disaster recovery mode to be communicated to one or more of the applications at the DC that are already executing at the DC when the determination is made. For example, this may include causing data to be written to a location in storage that the applications are configured to access when executing at the DC, for example causing a function in a shared library 217 that the applications are configured to call to be modified so as to represent the indication, as described above. Alternatively, or additionally, this may include transmitting a message, including data representing the indication, to the one or more applications, as described above.

The method includes, in step 208, in response to the determination, causing the indication that the applications at the DC are to operate in the disaster recovery mode to be communicated to one or more of the applications at the DC that start to execute at the DC after the determination is made. For example, this may include causing data to be written to a location in storage that the applications are configured to access when starting to execute at the DC, for example causing a function in a shared library 217 that the applications are configured to call when starting to execute at the DC to be modified so as to represent the indication, as described above.

Figure 5:
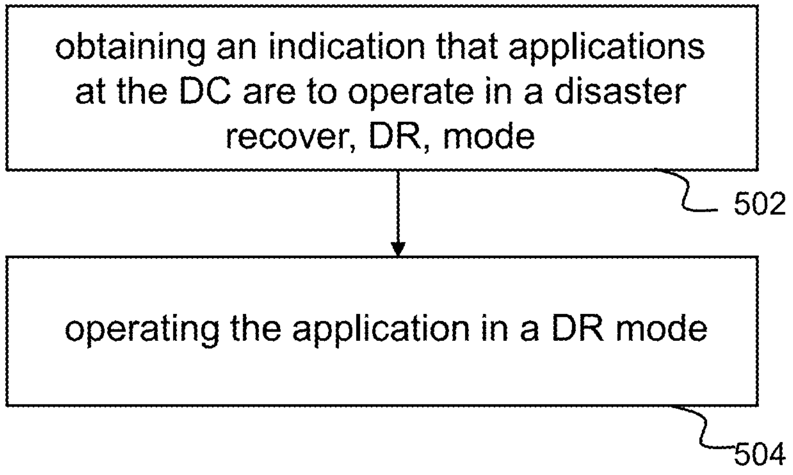
FIG. 5 illustrates a flow diagram of a method performed at a computing system of a second DC, according to an example.

Referring to FIG. 5, there is a flow there is a flow diagram illustrating a method according to another example. The method may be performed by applications at a data center or more generally a computing device (for example, the computing device 100 of FIG. 1) or computing devices on which the applications at the data center are configured to execute. For example, the method may be performed by the apps 214, 215 of the first DC 210, or more generally the computing device(s) configured to execute the apps 214, 215, according to any one of the examples described above with reference to FIG. 1 to FIG. 3. In examples, the applications are implemented by one or more computing devices each including a processor (for example, the processor 112 of FIG. 1) and a memory (for example, the memory 114 of FIG. 1). The method may be performed by the one or more processors. The one or more processors may be configured to perform the method. Each memory 114 may store instructions which, when executed, cause at least one processor (for example, the processor 112 of FIG. 1) of the computing device to perform the method, or functions defined by the method. The applications are controllable by one or more computing entities external to the DC, for example the first computing entity 230 external to the first DC 210, as described above. The DC includes a computing system that determines, on the basis of an indication that the applications at the DC are no longer controllable by the one or more entities external to the DC, that the applications at the DC are to operate in a disaster recovery mode. For example, the DC may include the first computing system 211 as described above.

The method includes, in step 502, at each of one or more of the applications at the DC that are already executing at the DC when the determination is made, and at each of one or more of the applications at the DC that start to execute at the DC after the determination is made, obtaining an indication, caused to be communicated by the computing system of the DC, that the applications at the DC are to operate in a disaster recovery mode. For example, obtaining the indication may include accessing a location in storage to read data representing the indication, for example, accessing the shared library 217 to call a function modified to represent the indication, as described above. This may occur when starting to execute the application and/or when executing the application, such as periodically, as described above. Alternatively, or additionally, this may include receiving a message including data representing the indication from the computing system of the DC, as described above.

The method includes, in step 504, at each of one or more of the applications at the DC that are already executing at the DC when the determination is made, and at each of one or more of the applications at the DC that start to execute at the DC after the determination is made, in response to obtaining the indication, operating the application in a disaster recovery mode. For example, operating the application in the disaster recovery mode may include, ceasing or stopping one or more functions performed by the application 214, 215 and/or preventing the application 214, 215 from performing one or more functions, as described above. For example, at each of the one or more of the applications at the DC that are already executing at the DC when the determination is made, operating the application in a disaster recovery mode may include one or more of: terminating one or more communications connections, established between the application 215 and a further computing entity 230, over which the application 215 sends data to the further computing entity 230; ceasing routing of data by the application 214 to one or more further applications 215 at the DC; ceasing processing of data by the application 214, 215; and shutting down the application 214, 215, as described above. As another, example, at each of the one or more of the applications at the DC that start to execute at the DC after the determination is made, operating the application in a disaster recovery mode may include one or more of: preventing the application 215 from establishing a communications connection, to a further computing entity 230, over which the application sends data to the further computing entity 230; preventing the application 214 from routing data to one or more further applications 215 of the DC; preventing the application 214, 215 from processing data; and shutting down the application 214, 215 before one or more functions of the application are performed.

Figure 6:
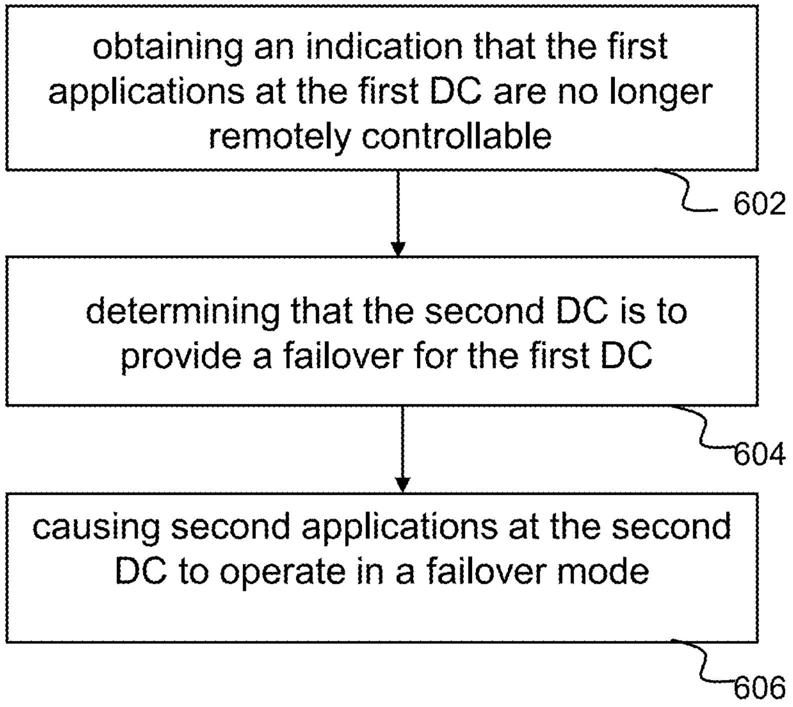
FIG. 6 illustrates a flow diagram of a method performed at one or more applications of the second DC, according to an example.

Referring to FIG. 6, there is a flow diagram illustrating a method according to a further example. The method may be performed by a computing system, for example the second computing system 221, 321 according to any of the examples described above with reference to FIG. 1 to FIG. 3. In examples, the computing system includes a processor (for example, the processor 112 of FIG. 1) and a memory (for example, the memory 114 of FIG. 1). The method may be performed by the processor. The processor may be configured to perform the method. The memory may store instructions which, when executed, cause at least one processor (for example, the processor 112 of FIG. 1) of a computing system to perform the method, or functions defined by the method. For example, the memory may store an application (for example, the application 130 of FIG. 1) including the instructions. The method is for controlling applications at a data center, for example the apps 224, 225 at the second DC 220 of any of the examples described above with reference to FIG. 1 to FIG. 3.

The method includes, in step 602, obtaining an indication that first applications at a first DC are no longer controllable by one or more computing entities external to the first DC. For example, the first applications 214, 215 of the first DC 210 may be controllable by the first computing entity 230, as described above, and step 602 may include obtaining an indication that the first applications 214, 215 are no longer remotely controllable by the first computing entity 230, as described above. For example, this may include determining that one or more communications connections between the first DC 210 and the second DC 220 (and/or one or more communications connections between the first DC 210 and one or more further DCs) have become inoperative, as described above.

The method includes, in step 604, determining, based on the indication, that the second DC is to provide a failover for the first DC. For example, the determination may be made responsive to obtaining the indication. As another example, the determination may include determining that the second DC 220 (among a plurality of possible DC's) is responsible for providing a for providing a failover for the first DC 210 as described above.

The method includes, in step 606, in response to the determination, causing one or more second applications at the second DC to operate in a failover mode to provide a failover for one or more of the first applications at the first DC. For example, the third app 224 and/or the fourth app 225 may be caused to provide a failover for the first app 215 and/or the second app 215, respectively, as described above with reference to FIG. 2.

In examples, a method may include the method described above with reference to FIG. 4 performed at a first computing system of a first DC (such as the first computing system 211 of the first DC 210, described above) and the method described above with reference to FIG. 5 performed at a second computing system of a second DC (such as the second computing system 222 of the second DC 220, described above).

Figure 7:
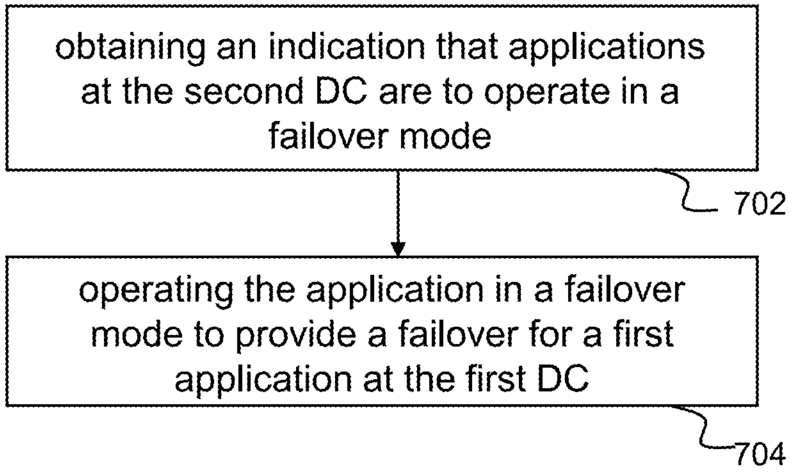
FIG. 7 illustrates a flow diagram of a method performed at one or more applications of the second DC, according to an example.

Referring to FIG. 7, there is a flow diagram illustrating a method according to a further example. The method includes, in step 702, obtaining an indication that applications at the second DC are to operate in a failover mode. The method further includes, in step 704, operating the application in a failover mode to provide a failover for a first application at the first DC.

VII. Example Electronic Trading System

Figure 8:
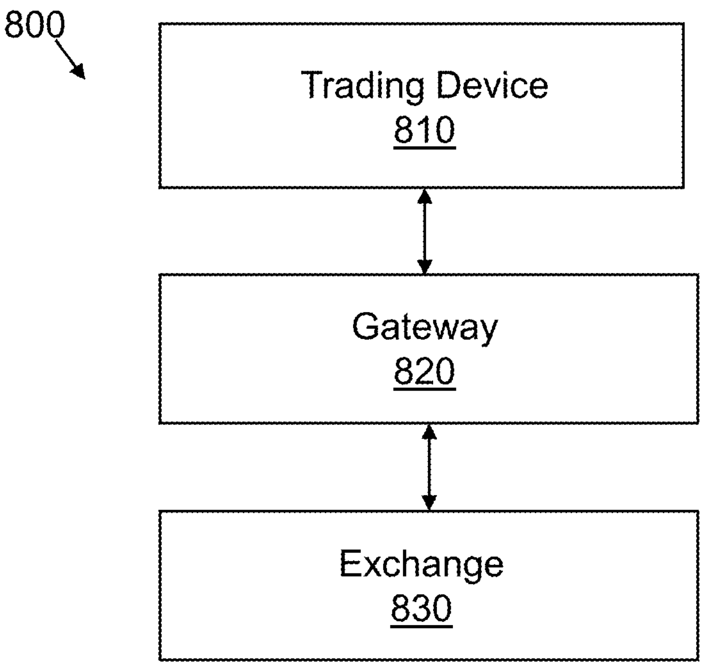
FIG. 8 illustrates a block diagram of an example electronic trading system in which certain embodiments may be employed.

FIG. 8 illustrates a block diagram representative of an example electronic trading system 800 in which certain embodiments may be employed. The system 800 includes a trading device 810, a gateway 820, and an exchange 830. The trading device 810 is in communication with the gateway 820. The gateway 820 is in communication with the exchange 830. As used herein, the phrase "in communication with" encompasses direct communication and/or indirect communication through one or more intermediary components. The trading device 810, the gateway 820 and/or the exchange 830 may include one or more computing devices 100 of FIG. 1. The exemplary electronic trading system 800 depicted in FIG. 8 may be in communication with additional components, subsystems, and elements to provide additional functionality and capabilities without departing from the teaching and disclosure provided herein.

In operation, the trading device 810 may receive market data from the exchange 830 through the gateway 820. The trading device 810 may send messages to the exchange 830 through the gateway 820. A user may utilize the trading device 810 to monitor the market data and/or base a decision to send an order message to buy or sell one or more tradeable objects to the exchange 830. The trading device 810 may use the market data to take trade actions such as to send an order message to the exchange 830. For example, the trading device may run an algorithm that uses the market data as input and outputs trade actions, such as to send an order message to the exchange 830. The algorithm may or may not require input from a user in order to take the trade actions.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 810 may include one or more electronic computing platforms. For example, the trading device 810 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 810 may include a single or multi-core processor in communication with a memory or other storage medium configured to accessibly store one or more computer programs, applications, libraries, computer readable instructions, and the like, for execution by the processor.

By way of example, the trading device 810 may include a computing device, such as a personal computer or mobile device, in communication with one or more servers, where collectively the computing device and the one or more servers are the trading device 810. For example, the trading device 810 may be a computing device and one or more servers together running TT® Platform, an electronic trading platform provided by Trading Technologies International, Inc. of Chicago Illinois ("Trading Technologies"). For example, the one or more servers may run one part of the TT platform, such as a part providing a web server, and the computing device may run another part of the TT platform, such as a part providing a user interface function on a web browser. The computing device and the server may communicate with one another, for example using browser session requests and responses or web sockets, to implement the TT platform. As another example, the trading device 810 may include a computing device, such as a personal computer or mobile device, running an application such as TT® Desktop or TT® Mobile, which are both electronic trading applications also provided by Trading Technologies. As another example, the trading device 810 may be one or more servers running trading tools such as ADL®, AUTOSPREADER®, AUTOTRADER™, and/or MD TRADER®, also provided by Trading Technologies.

The trading device 810 may be controlled or otherwise used by a user. As used herein, the phrase "user" may include, but is not limited to, a human (for example, a trader), trading group (for example, a group of traders), or an electronic trading device (for example, an algorithmic trading system). One or more users may be involved in the control or other use of the trading device.

The trading device 810 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 810 from another computer readable medium. For example, the trading application (or updates to the trading application) may be stored by a manufacturer, developer, or publisher on one or more CDs, DVDs, or USB drives, which are then loaded onto the trading device 810 or to a server from which the trading device 810 retrieves the trading application. As another example, the trading device 810 may receive the trading application (or updates to the trading application) from a server, for example, via the Internet or an internal network. The trading device 810 may receive the trading application or updates when requested by the trading device 810 (for example, "pull distribution") and/or un-requested by the trading device 810 (for example, "push distribution").

The trading device 810 may be adapted to send order messages. For example, the order messages may be sent to through the gateway 820 to the exchange 830. As another example, the trading device 810 may be adapted to send order messages to a simulated exchange in a simulation environment which does not effectuate real-world trades.

The order messages may be sent at the request of a user. For example, a trader may utilize the trading device 810 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 810 to the exchange 830 through the gateway 820. The trading device 810 may communicate with the gateway 820 using a local area network, a wide area network, a multicast network, a wireless network, a virtual private network, an internal network, a cellular network, a peer-to-peer network, a point-of-presence, a dedicated line, the Internet, a shared memory system and/or a proprietary network.

The gateway 820 may include one or more electronic computing platforms. For example, the gateway 820 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 820 facilitates communication. For example, the gateway 820 may perform protocol translation for data communicated between the trading device 810 and the exchange 830. The gateway 820 may process an order message received from the trading device 810 into a data format understood by the exchange 830, for example. Similarly, the gateway 820 may transform market data in an exchange-specific format received from the exchange 830 into a format understood by the trading device 810, for example. As described in more detail below with reference to FIG. 9, in some examples, the gateway 820 may be in communication with cloud services, which may support functions of the gateway 820 and/or the trading device 810.

The gateway 820 may include a trading application, similar to the trading applications discussed above, that facilitates or improves electronic trading. For example, the gateway 820 may include a trading application that tracks orders from the trading device 810 and updates the status of the order based on fill confirmations received from the exchange 830. As another example, the gateway 820 may include a trading application that coalesces market data from the exchange 830 and provides it to the trading device 810. In yet another example, the gateway 820 may include a trading application that provides risk processing, calculates implieds, handles order processing, handles market data processing, or a combination thereof.

In certain embodiments, the gateway 820 communicates with the exchange 830 using a local area network, a wide area network, a multicast network, a wireless network, a virtual private network, an internal network, a cellular network, a peer-to-peer network, a point-of-presence, a dedicated line, the Internet, a shared memory system, and/or a proprietary network.

The exchange 830 may be owned, operated, controlled, or used by an exchange entity. Example exchange entities include the CME Group, the Chicago Board Options Exchange, the Intercontinental Exchange, and the Singapore Exchange. The exchange 830 may be an electronic exchange that includes an electronic matching system, such as a computer, server, or other computing device, which is adapted to allow tradeable objects, for example, offered for trading by the exchange, to be bought and sold. The exchange 830 may include separate entities, some of which list and/or administer tradeable objects and others which receive and match orders, for example. The exchange 830 may include an electronic communication network ("ECN"), for example.

The exchange 830 is adapted to receive order messages and match contra-side trade orders to buy and sell tradeable objects. Unmatched trade orders may be listed for trading by the exchange 830. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 810 or other devices in communication with the exchange 830, for example. For example, typically the exchange 830 will be in communication with a variety of other trading devices (which may be similar to trading device 810) which also provide trade orders to be matched.

The exchange 830 is adapted to provide market data. Market data may be provided in one or more messages or data packets or through a shared memory system. For example, the exchange 830 may publish a data feed to subscribing devices, such as the trading device 810 or gateway 820. The data feed may include market data.

The system 800 may include additional, different, or fewer components. For example, the system 800 may include multiple trading devices, gateways, and/or exchanges. In another example, the system 800 may include other communication devices, such as middleware, firewalls, hubs, switches, routers, servers, exchange-specific communication equipment, modems, security managers, and/or encryption/decryption devices.

In examples, the gateway 820 may be provided by or include the first DC 210 of any of the examples described above with reference to FIG. 1 to FIG. 7. For example, the gateway 820 may be configured to provide the same or similar functionality as the first DC 210, or more specifically the first computing system 211 of the first DC 210, according to any of the examples described above with reference to FIG. 1 to FIG. 7. In some examples, the gateway 820 may alternatively be provided by or include the second DC 220 of any of the examples described above with reference to FIG. 1 to FIG. 7. For example, where the first DC 210 is operating normally, the gateway 820 may be provided by or include the first DC 220. However, when the first DC 210 is no longer available to the first computing entity 230 the first DC 210 may be failed over to the second DC 220, at which point the gateway 820 may be provided by or include instead the second DC 220. The exchange 830 may be provided by the second computing entity 240 according to any one of the examples described above with reference to FIG. 1 to FIG. 7. For example, the exchange device 8300 may be configured to provide the same or similar functionality as the second computing entity 240 according to any of the examples described above with reference to FIG. 1 to FIG. 7.

In examples, the gateway 820 implements apps that are controllable by one or more computing entities external to the gateway 820. For example, as described in more detail below with reference to FIG. 9, the gateway 820 may include a strategy engine app, a risk server app, and an order connector app. In examples where the gateway 820 is provided by the first DC 210 as described above, in response to determining that gateway 820 is no longer available to one or more computing entities external to the gateway, and therefore the apps are no longer controllable by the one or more external computing entities, the gateway 820 may cause the apps to operate in a disaster recovery mode, as described above. In examples where the gateway 820 is provided by the second DC 220 to provide a failover for the first DC 210, as described above, in response to determining that the applications at the first DC 210 are no longer controllable by the one or more external computing entities, the gateway 820 may cause the apps to operate in a failover mode to provide a failover for apps at the first DC 210.

VIII. Specific Example Electronic Trading System

Figure 9:
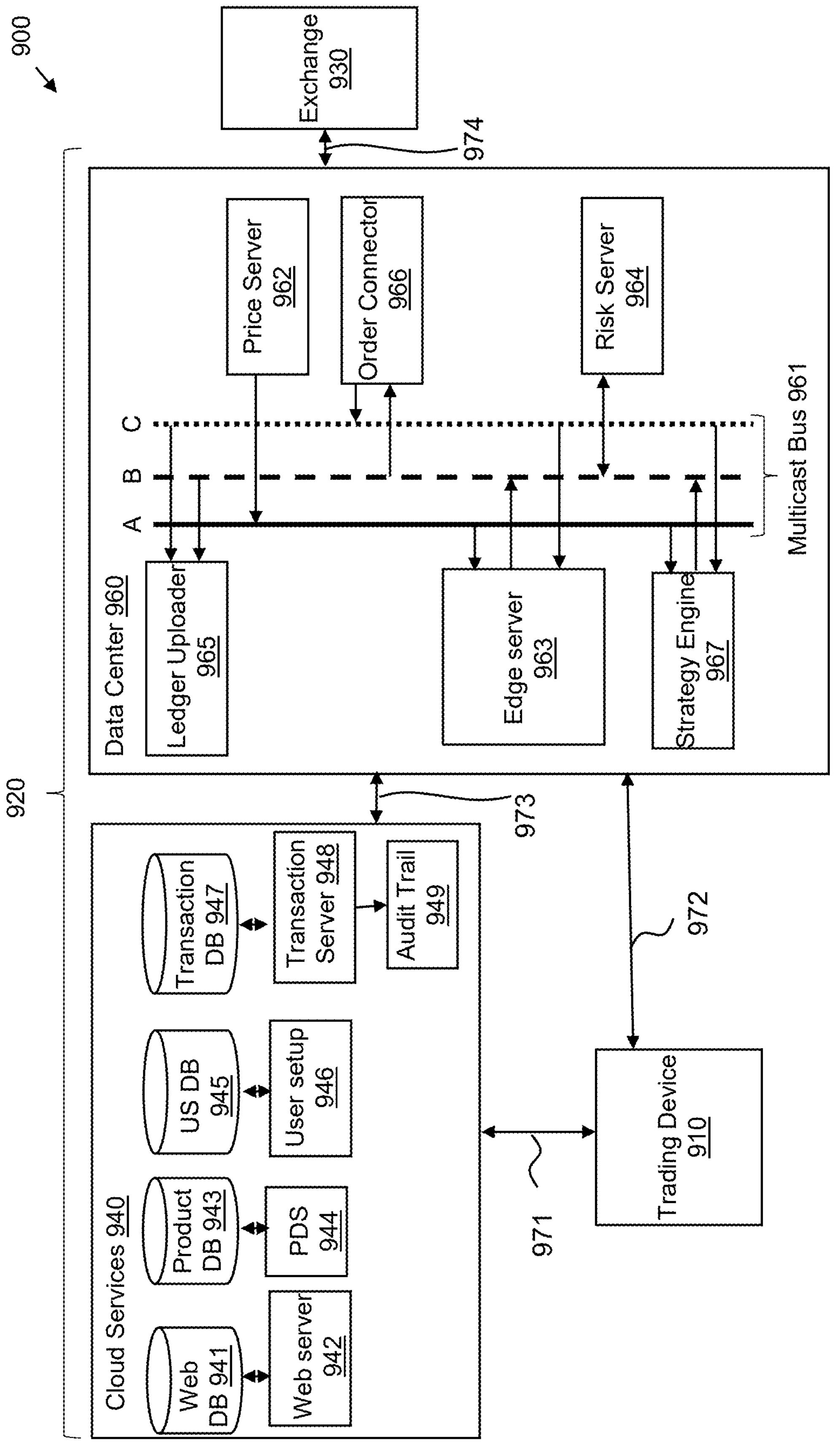
FIG. 9 illustrates a block diagram of another example electronic trading system in which certain embodiments may be employed.

FIG. 9 illustrates a block diagram representative of an example electronic trading system 900 in which certain embodiments may be employed. The electronic trading system 900 includes a trading device 910, a hybrid cloud system 920, and an exchange 930. The trading device 910 may be the same or similar to the trading device 810 described above with reference to FIG. 8. The exchange 930 may be the same or similar to the exchange 830 described above with reference to FIG. 8. The hybrid cloud system 920, or one or more components thereof, may provide one or more of the functions of the gateway 820 described above with reference to FIG. 8. That is, the functionality of the gateway 820 described above with reference to FIG. 8, or one or more parts of that functionality, may be included within the hybrid cloud system 920.

The hybrid cloud system 920 includes cloud services 940 and data center 960. In the example illustrated in FIG. 9, the cloud services 940 and the components thereof are separate from the data center 960. However, in other examples (not shown), one or more or all of the components and/or functions of the cloud services 940 may instead be implemented in the data center 960. In such examples, or otherwise, the electronic trading system 900 may not include the cloud services 940. In such examples, one or more of the functions of the gateway 820 described above with reference to FIG. 8 may be provided by the data center 960, or one or more components thereof, alone.

In order to provide lower latency for time sensitive processes, the data center 960 may be co-located with the exchange 930 or located in proximity to the exchange 930. Accordingly, functions of the hybrid cloud system 920 that are time sensitive or otherwise benefit from a lower latency with the exchange 930, may be carried out by the data center 960. In general, functions of the hybrid cloud system 920 that are not time sensitive or do not benefit from lower latency with the exchange 930, may be carried out by the cloud services 940. The hybrid cloud system 920 allows for the electronic trading system 900 to be scalable with respect to non-time critical functions while still providing relatively low latency with the exchange 930.

In the example of FIG. 9, the trading device 910 is in communication with the cloud services 940 over a first network 971. For example, the first network 971 may be a wide area network such as the Internet using a hypertext transfer protocol (HTTP) connection. The trading device 910 is in communication with the data center 960 over a second network 972. For example, the trading device 910 may communicate with the data center 960 over a virtual private network or using a secure web socket or a TCP connection. The first network 971 and the second network 972 may be the same network. The data center 960 communicates with the cloud services 940 over a third network 973. For example, the data center 960 may communicate with the cloud services 940 over a private network or virtual private network (VPN) tunnel. The third network 973 may be the same as the first network 971 and/or the second network 972. The data center 960 communicates with the exchange 930 over a fourth network 974. For example, the data center 960 may communicate with the exchange 930 using a local area network, a wide area network, a multicast network, a wireless network, a virtual private network, an internal network, a cellular network, a peer-to-peer network, a point-of-presence, a dedicated line, the Internet, a shared memory system, and/or a proprietary network. The fourth network 974 may be the same as the first network 971, the second network 972 and/or the third network 973.

The cloud services 940 may be implemented as a virtual private cloud, which may be provided by a logically isolated section of an overall web services cloud. In this example, the cloud services 940 include a web database 941 and associated web server 942, a product database 943 and associated product data server (PDS) 944, a user setup database 945 and associated user setup server 946, and a transaction database 947 and associated transaction server 948.

The trading device 910 may communicate with the web server 942. As one example, the trading device 910 may run a web browser, referred to in this disclosure as a browser, which establishes a browsing session with the web server 942. This may occur after appropriate domain name resolution to an IP address of the cloud services 940 and/or after appropriate authentication of the trading device 910 (or user thereof) with the cloud services 940. The browser sends requests to the web server 942, and the web server 942 provides responses to the browser, for example using the HyperText Transfer Protocol (HTTP) or the Secure HyperText Transfer Protocol (HTTPS) protocol. The web server 942 may provide a user interface to the browser, via which a user can interact with the electronic trading platform. The user interface may allow market data to be displayed and/or allow trade orders to be placed. As another example, the trading device 910 may run an application which communicates with the web server 942, such as via an application programming interface (API), to allow a user to interact with the electronic trading platform. The application may provide a user interface via which a user can interact with the electronic trading platform.

The trading device 910 may communicate with the PDS 944. The PDS 944 interfaces with the Product DB 943. The Product DB 943 stores definitions of instruments and permissions of users with respect to the instruments. Specifically, the Product DB 943 stores definitions of tradeable objects, as well as permissions of users to place trade orders with respect to tradeable objects. This information may be provided to the trading device 910. This information may be used by a user interface of the trading device 910 to determine, for the given user of the trading device 910, for which tradeable objects trade orders are allowed to be placed.

The trading device 910 may communicate with the user setup server 946. The user setup server 946 interfaces with the user setup database 945, which stores user's settings, preferences, and other information associated with the user's account. This information may be provided by the trading device 910 to the user setup server 946 on user registration, or at certain times after registration, and the user setup server 946 may store this information in the user setup database 945. This information may be provided to the trading device 910. This information may be used by a user interface of the trading device 910 to determine which market data is to be shown and in which format.

The transaction database 947 stores information on transactions carried out using the electronic trading system 900. The transaction database 947 may store all of the trade orders submitted by users and all of the corresponding order execution reports provided by the exchange 930 when the trade order is executed. The transaction server 948 may interrogate the transaction database 947 to produce an audit trail 949, for example for a given user. This audit trail 949 may be provided to the trading device 910 (or another device) to allow inspection and/or analysis of the trading activity of a given user.

The data center 960 includes a multicast bus 961, a price server 962, an edge server 963, a risk server 964, a ledger uploader server 965, an order connector 966, and a strategy engine server 967. The various components within the data center 960 communicate with one another using the multicast bus 961. This allows for efficient and scalable communications between the components within the data center 960. For example, information provided by one of the components may be received by multiple other of the components. Transmitting this information on a multicast bus 961 to which the other components are subscribed allows for the information to be transmitted in one message, irrespective of how many components may receive the information.

The price server 962 receives market data from the exchange 930. The price server 962 converts this information into a format and/or syntax associated with (for example, used by) the electronic trading system 900. The price server 962 transmits the converted information as one or more multicast messages on the multicast bus 961. Specifically, the price server 962 multicasts this information on a first multicast bus A, to be received by price clients. The edge server 963 and the strategy engine server 967 subscribe to the first multicast bus A and receive the market data from the price server 962. The price server 962 may communicate with the cloud services 940. For example, the price server 962 may provide information on products or tradeable objects to the PDS server 944 for the PDS server 944 to use in defining tradeable objects.

The edge server 963 communicates with the trading device 910. For example, the trading device 910 may communicate with the edge server 963 over a secure web socket or a TCP connection. In some examples, the edge server 963 may be implemented as a server cluster. The number of servers in the cluster may be determined and scaled as necessary depending on utilization. The edge server 963 receives market data over the first multicast bus A and routes the market data to the trading device 910. A user of the trading device 910 may decide to place a trade order based on the market data. The edge server 963 routes trading orders from the trading device 910 towards the exchange 930. Specifically, when the edge server 963 receives an order message from the trading device 910, the edge server 963 multicasts the order message (or at least a portion of the contents thereof) on a second multicast bus B, to be received by order clients. The risk server 964 subscribes to the second multicast bus B and receives the order message from the edge server 963.

The risk server 964 is used to determine a pre-trade risk for a given trade order contained in a given order message. For example, for a given trade order, the risk server 964 may determine whether or not the user placing the trade order is permitted to do so. The risk server 964 may determine whether the user is permitted to trade the quantity of the tradeable object specified in the trade order. The risk server 964 may prevent unauthorized trade orders being placed. The risk server 964 receives the order message from the edge server 963 over the second multicast bus B and processes the order message to determine a risk for the trade order of the message. If the risk server 964 determines that the trade order should not be placed (for example, a risk associated with the trade order is over a threshold) the risk server 964 prevents the trade order from being placed. For example, in this case, the risk server 964 may not transmit the order message to the order connector 966 and may instead transmit a message indicating to the user that the trade order was not placed. If the risk server 964 determines that the trade order should be placed (for example, a risk associated with the trade order is below a threshold) the risk server 964 forwards the order message to the order connector 966. Specifically, the risk server 964 multicasts the order message on the second multicast bus B. The order connector 966 and the ledger uploader 965 are subscribed to the second multicast bus B and receive the order message from the risk server 964.

The ledger uploader server 965 is in communication with the transaction database 947 of the cloud services 940. The ledger uploader server 965 receives the order message from the risk server 964 and transmits the order message to the transaction database 947. The transaction database 947 then stores the order message (or at least a portion of the contents thereof) in the ledger stored in the transaction database 947.

The order connector 966 is in communication with the exchange 930. The order connector 966 receives the order message from the risk server 964, processes the order message for sending to the exchange 930, and sends the processed order message to the exchange 930. Specifically, the processing includes processing the order message into a data format understood by the exchange 930. If the trade order within the order message is executed by the exchange 930, the exchange 930 sends a corresponding execution report message to the order connector 966. The execution report message includes an execution report detailing the execution of the trade order. The order connector 966 applies processing to the execution report message. Specifically, the processing includes processing the execution report message into a data format understood by the electronic trading system and the trading device 910. The order connector 966 multicasts the processed execution report message on a third multicast bus C for receipt by execution report clients. The edge server 963 and the ledger uploader 965 are subscribed to the third multicast bus C and receive the processed execution report message. The ledger uploader 965 communicates with the transaction database 947 to update the ledger with the execution report message (or at least a portion of the contents thereof). The edge server 963 forwards the execution report message to the trading device 910. The trading device 910 may display information based on the execution report message to indicate that the trade order has been executed.

In some examples, order messages may be submitted by the strategy engine server 967. For example, the strategy engine server 967 may implement one or more strategy engines using an algorithmic strategy engine and/or an autospreader strategy engine. The strategy engine 967 may receive market data (from the price server 962 via the first multicast bus A) and automatically generate order messages on the basis of the market data and a suitably configured algorithm. The strategy engine server 967 may transmit an order message to the order connector 966 (via the risk server 964 and the second multicast bus B), and the order connector 966 processes the order message in the same way as described above. Similarly, when the exchange 930 executes the order, the strategy engine 967 may receive (via the third multicast bus C) a corresponding order execution report message from the order connector 966. The order message and the execution report message may be transmitted to the ledger uploader 965 in a similar way to as described above, in order for the ledger uploader 965 to update the ledger stored by the transaction database 947.

In some examples, the trade orders sent by the trading device 910 may not be submitted by a person. For example, the trading device 910 may be a computing device implementing an algorithmic trading application. In these examples, the trading device 910 may not communicate with the web server 942, PDS 944, and/or the user setup server 946, and may not utilize a browser or a user interface for submitting trades. The application running on the trading device 910 may communicate with an adapter associated with the edge server 963. For example, the application and the adapter may communicate with each other using Financial Information Exchange (FIX) messages. In these examples, the adapter may be a FIX adapter. The application running on the trading device 910 may receive market data in a FIX format (the market data being provided by the price server 962 and converted into the FIX format by the FIX adapter associated with the edge server 963). The application running on the trading device 910 may generate trade orders based on the received market data, and transmit order messages in a FIX format to the FIX adapter associated with the edge server 963. The FIX adapter associated with the edge server 963 may process the order messages received in the FIX format into a format understood by the components of the data center 960.

It is to be understood that the electronic trading system 900 is merely an example, and other electronic trading systems could be used. As one example, the electronic trading system 900 need not necessarily include the cloud services 940. As another example, the data center 960 may include more or fewer components than described above with reference to FIG. 9. As another example, a form of messaging between components of the data center 960 other than multicast messaging may be used.

In examples, the data center 960 may be provided by or include the first DC 210, 310 or the second DC 220, 320 of any of the examples described above with reference to FIG. 1 to FIG. 7. For example, the data center 960 may be configured to provide the same or similar functionality as the first DC 210 or the second DC 220 according to any of the examples described above with reference to FIG. 1 to FIG. 7. Accordingly, in examples, the first DC 210, 310 or the second DC 220, 320 according to any of the examples described above with reference to FIG. 1 to FIG. 7 may be implemented by the data center 960. In examples, the exchange 930 may be provided by or include the second computing entity 240, 360 according to any of the examples described above with reference to FIG. 1 to FIG. 7. Accordingly, the exchange 930 is an example of the second computing entity 240, 360 described above with reference to FIG. 1 to FIG. 7.

In examples where the data center 960 is provided by the first DC 210, the strategy engine 967 is an example of the first app 214 described above with reference to FIG. 2, the risk server 964 is another example of the first app 214 described above with reference to FIG. 2, and the order connector 966 is an example of the second app 215 described above with reference to FIG. 2. In examples where the data center 960 is provided by the second DC 220, the strategy engine 967 is an example of the third app 224 described above with reference to FIG. 2, the risk server 964 is another example of the third app 224 described above with reference to FIG. 2, and the order connector 966 is an example of the fourth app 225 described above with reference to FIG. 2.

The apps 967, 964, 966 of the data center 960 are controllable by one or more computing entities external to the data center 960. For example, one or more of the strategy engine 967, the risk server 964 and the order connector 966 may be controllable by one or more computing entities external to the data center 960. For example, the strategy engine 967 may automatically generate order messages on the basis of market data and a suitably configured algorithm. The strategy engine 967 may be controllable by an external computing entity, such as the trading device 910 or another device (not shown), to start, stop, or change the function of the algorithm. The risk server 964 and/or the order connector 966 may be controllable by one or more computing entities external to the data center 960, such as a computing device of an operator of the data center 960 (not shown in FIG. 9).

In examples where the data center 960 is provided by the first DC 210, 310 as described above, in response to determining that data center 960 is no longer available to one or more computing entities external to the data center 960, and therefore the apps 967, 964, 966 are no longer controllable by the one or more external computing entities, the data center 960 may cause the apps to operate in a disaster recovery mode, as described above. For example, the strategy engine 967 may stop processing market data, may stop generating order messages, and/or may shut down. This may help prevent uncontrolled order messages from being sent by the strategy engine 967 towards the exchange 830. Further, this may help effective failover of the strategy engine 967 to another data center. For example, it may be beneficial for the strategy engine 967 to not be operating in two places at the same time, as this may result in distorted or otherwise unwanted trade orders being generated. Accordingly, stopping the strategy engine 967 from processing data or shutting down the strategy engine 967 may help ensure that when the strategy engine 967 is failed-over to another data center, the trade orders are not being made twice with the exchange 930. As another example, the risk server 964 may stop routing order messages to the order connector 966. This may help prevent uncontrolled order messages from being sent towards to the exchange 930 and/or may help provide an effective failover of the strategy engine 967 and/or the risk server 964. As another example, the order connector 966 may terminate the communications connections with the exchange 930. This may help prevent uncontrolled order messages from being sent to the exchange 930. Further, in examples the exchange 930 may only support or otherwise allow one communication connection per trading account. Accordingly, the order connector 966 terminating a communication connection, associated with a particular trading account, with the exchange 930 may allow for a communication connection for the particular trading account to be established instead from an order connector of a failover data center to the exchange 930. This may, in turn, allow for the effective failover of the order connector 966 to a failover data center.

In examples, instances of the strategy engine 967, the risk server 964 and/or the order connector 966 may attempt to execute after the data center 960 becomes unavailable to the one or more external computing entities. In this case, operating the strategy engine 967 in the disaster recovery mode may include preventing market data from being processed, preventing trade orders from being generated, and/or shutting down the strategy engine 967 before any order messages are generated by the strategy engine 967. As another example, operating the risk server 964 in a disaster recovery mode may include preventing data from being routed by the risk server 964, or may shutting down the risk server 964 before any order messages are routed to the order connector 966. As another example, operating the order connector 966 in a disaster recovery mode may include preventing communications connections from being made with the exchange 930, or shutting down the order connector 966 before any communications connections are established with the exchange 930. As above, this may prevent uncontrolled orders or order modifications or deletions from reaching the exchange 930 and/or may help provide an effective failover of these applications to another DC.

In examples where the data center 960 is provided by the second DC 220, 320 so as to provide a failover for the first DC 210, 310 as described above, in response to determining that the applications at the first DC 210, 310 are no longer controllable by the one or more external computing entities, the data center 960 may cause the apps to operate in a failover mode to provide a failover for apps at the first DC 210, 310. For example, the strategy engine 967 may be caused to provide a failover for the stagey engine of the first DC 210, the risk server 964 may be caused to provide a failover for the risk server of the first DC 210 and/or the order connector 966 may be caused to provide a failover for the order connector of the first DC 210.

As one example, the order connector 966 may receive an indication that it is to operate in a failover mode to provide a failover for the order connector of the first DC 210. In response, the order connector 966 may establish communications connections with the exchange 930 (the exchange 930 in this case originally being served by the first DC 210). For example, the order connector 966 may establish a communications connection with the exchange 930 for each trading account that was active at the first DC 210. For example, the user setup DB 945 may store the accounts for which the order connector of the first DC 210 had (or should have had) connections established with the exchange 930. The order connector 966 may access the user setup DB 945 to determine the accounts for which the order connector of the first DC 210 had (or should have had) connections established with the exchange 930. The order connector 966 may also determine from the user setup DB 945 information for each account that may needed to establish the connection with the exchange, such as a username and/or credentials. The order connector 966 may then establish the communications connections accordingly with the exchange 930, thereby to provide a failover for the order connector of the first DC 210.

As another example, the risk server 964 may receive an indication that it is to operate in a failover mode to provide a failover for the risk server of the first DC 210. In response, the risk server 964 may assess the risk of trade orders destined for the exchange 930 and, if the risk is acceptable, route the trade orders to the order connector 966 for sending to the exchange 930. In some examples, trade orders destined for the exchange 930 may anyway be routed to the risk server 964. Under normal operating conditions, the risk server 964 may assess the risk of these trade orders but not route those orders to the order connector 966. In these examples, operating the risk server 964 in the failover mode may include routing those orders (which are destined for the exchange 930 and assessed to have an acceptable risk) to the order connector 966. This may help provide for a fast failover of the risk server of the first DC 210.

As another example, the strategy engine 967 may receive an indication that it is to operate in a failover mode to provide a failover for the strategy engine of the first DC 210. In response, the strategy engine 967 may determine one or more algorithms that were being run by the strategy engine of the first DC 210. For example, the user setup DB may store, in respect of each user, an indication of an algorithm run by the first DC 210 in respect of that user. The strategy engine 967 may access the user setup DB 945 and determine the one or more algorithms that were being run by the strategy engine of the first DC 210. The strategy engine 967 may then initialize the determined algorithm(s) on the strategy engine 967. Further, the strategy engine 967 may obtain the latest state information of the algorithm(s) run on the strategy engine of the first DC 210. For example, the strategy engine 967 may access the transaction database 947 to determine the last trade orders that were made by a particular algorithm of the strategy engine of the first DC 210, and any execution reports that were received from the exchange in respect of those trade orders. Using this information, as well as the market data in respect of the exchange 930 from the price server 962, the strategy engine 967 may execute the algorithm(s) as from where the algorithm(s) in the first DC 210 ceased. The resulting trade orders in respect of the exchange 930 may be routed from the strategy engine 967 to the risk server 964 via multicast bus B. The risk server 964 may route those trade orders (provided they are of acceptable risk) to the order connector via multicast bus B. The order connector may then send these trade orders, over the appropriate connection established with the exchange 930, to the exchange 930. The exchange 930 may return execution reports to the strategy engine 967 via the order connector 966 and multicast bus C, as described above. Accordingly, the data center 960 may provide for an effective failover of the first DC 210.

As used herein, the phrases "configured to" and "adapted to" encompass that an element, structure, or device has been modified, arranged, changed, or varied to perform a specific function or for a specific purpose.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example. The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made, and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

CLAUSES

1. A method of controlling applications at a data center, DC, the applications being controllable by one or more computing entities external to the DC, the method including: at a computing system of the DC:
   obtaining an indication that the applications at the DC are no longer controllable by the one or more computing entities external to the DC;
   determining, based on the indication, that the applications at the DC are to operate in a disaster recovery mode; and
   in response to the determination:
   causing an indication that the applications at the DC are to operate in the disaster recovery mode to be communicated to one or more of the applications at the DC that are already executing at the DC when the determination is made; and
   causing the indication that the applications at the DC are to operate in the disaster recovery mode to be communicated to one or more of the applications at the DC that start to execute at the DC after the determination is made.
2. The method according to clause 1, wherein causing the indication to be communicated to the one or more of the applications at the DC that start to execute at the DC after the determination is made, includes, at the computing system of the DC:
   causing data, representing the indication, to be written to a location in storage which applications are configured to access when starting to execute at the DC.
3. The method according to clause 2, wherein the one or more of the applications at the DC already executing at the DC are configured to access the location, and causing, at the computing system of the DC, the data to be written to the location in storage causes the indication to be communicated to the one or more of the applications at the DC already executing at the DC.
4. The method according to clause 2, wherein causing, at the computing system of the DC, the data to be written to the location in storage includes:
   causing a function to be modified so as to represent the indication, the function being stored in a library that is used by the applications at the DC, wherein the library is accessible by the applications at the DC when starting to execute at the DC, the function being one that the applications at the DC call from the library when starting to execute at the DC.
5. The method according to any one of clause 1 to clause 4, wherein causing the indication to be communicated to the one or more applications at the DC already executing at the DC includes, at the computing system of the DC:
   causing data, representing the indication, to be written to a location in storage which applications are configured to access when executing at the DC.
6. The method according to any one of clause 1 to clause 5, wherein causing the indication to be communicated to the one or more applications at the DC already executing at the DC includes, at the computing system of the DC:

transmitting a message, including data representing the indication, to the one or more applications at the DC already executing at the DC, over an internal communications network of the DC.

7. The method according to clause 6, wherein transmitting the message includes multicasting the message to the one or more applications at the DC already executing at the DC over the internal communications network.

8. The method according to any one of clause 1 to clause 7, wherein obtaining the indication that applications at the DC are no longer controllable by the one or more entities external to the DC includes, at the computing system of the DC:

determining that one or more communications connections between the DC and one or more further data centers, DCs, have become inoperative.

9. A method of controlling applications at a data center, DC, the applications being controllable by one or more computing entities external to the DC, the DC including a computing system that determines, on the basis of an indication that the applications at the DC are no longer controllable by the one or more entities external to the DC, that the applications at the DC are to operate in a disaster recovery mode, the method including:

at each of one or more of the applications at the DC that are already executing at the DC when the determination is made:

obtaining an indication, caused to be communicated by the computing system of the DC, that the applications at the DC are to operate in a disaster recovery mode; and in response to obtaining the indication, operating the application in a disaster recovery mode; and at each of one or more of the applications at the DC that start to execute at the DC after the determination is made:

obtaining the indication, caused to be communicated by the computing system of the DC, that the applications at the DC are to operate in the disaster recovery mode; and in response to obtaining the indication, operating the application in a disaster recovery mode.

10. The method according to clause 9, wherein the indication is caused to be communicated by the computing system of the DC by causing data, representing the indication, to be written to a location in storage, and wherein obtaining the indication includes:

at each of the one or more applications at the DC that start to execute at the DC after the determination is made:

accessing the location when starting to execute the application to read the data representing the indication.

11. The method according to clause 10, wherein obtaining the indication includes:

at each of the one or more applications at the DC that are already executing at the DC when the determination is made:

accessing the location during execution of the application to read the data representing the indication.

12. The method according to any one of clause 9 to clause 11, wherein the indication is caused to be communicated by the computing system of the DC by causing a function to be modified so as to represent the indication, the function being stored in a library accessible to the applications at the DC, and wherein obtaining the indication includes:

at each of the one or more applications at the DC that start to execute at the DC after the determination is made:

accessing the library to call the modified function when starting to execute the application.

13. The method according to any one of clause 9 to clause 12, wherein the indication is caused to be communicated by the computing system of the DC by transmitting a message, to the one or more applications at the DC already executing at the DC, and wherein obtaining the indication includes:

at each of the one or more applications at the DC already executing at the DC when the determination is made:

receiving the message, from the computing system of the DC, over an internal communications network of the DC.

14. The method according to any one of clause 9 to clause 13, wherein, at each of the one or more of the applications at the DC that are already executing at the DC when the determination is made, operating the application in a disaster recovery mode includes one or more of:

terminating one or more communications connections, established between the application and a further computing entity, over which the application sends data to the further computing entity;

ceasing routing of data by the application to one or more further applications at the DC;

ceasing processing of data by the application; and shutting down the application.

15. The method according to any one of clause 9 to clause 14, wherein, at each of the one or more of the applications at the DC that start to execute at the DC after the determination is made, operating the application in a disaster recovery mode includes one or more of:

preventing the application from establishing a communications connection, to a further computing entity, over which the application sends data to the further computing entity;

preventing the application from routing data to one or more further applications of the DC;

preventing the application from processing data; and shutting down the application before one or more functions of the application are performed.

16. A computing system for controlling applications at a data center, DC, the applications being controllable by one or more computing entities external to the DC, the computing system including:

a memory; and at least one processor configured to:

obtain an indication that applications at the DC are no longer controllable by the one or more computing entities external to the DC;

determine, based on the indication, that the applications at the DC are to operate in a disaster recovery mode; and in response to the determination:

cause an indication that the applications at the DC are to operate in a disaster recovery mode to be communicated to one or more of the applications at the DC that are already executing at the DC when the determination is made; and cause the indication that the applications at the DC are to operate in the disaster recovery mode to be communicated to one or more of the applications at the DC that start to execute at the DC after the determination is made.

17. The computing system according to clause 16, wherein the at least one processor is configured to perform the method according to any one of clause 2 to clause 8.

18. A computing system including a memory and at least one processor configured to perform the method according to any to any one of clause 9 to clause 15.

19. A tangible computer readable medium including instructions which, when executed, cause at least one processor of a computing system to perform functions, the computing system being for controlling applications at a data center, DC, the applications being controllable by one or more computing entities external to the DC, the functions including at least:

obtaining an indication that applications at the DC are no longer controllable by the one or more computing entities external to the DC;

determining, based on the indication, that the applications at the DC are to operate in a disaster recovery mode; and in response to the determination:

causing an indication that the applications at the DC are to operate in a disaster recovery mode to be communicated to one or more of the applications at the DC that are already executing at the DC when the determination is made; and causing the indication that the applications at the DC are to operate in the disaster recovery mode to be communicated to one or more of the applications at the DC that start to execute at the DC after the determination is made.

20. The tangible computer readable medium according to clause 19, wherein the functions include at least the method according to any one of clause 2 to clause 8.

21. A tangible computer readable medium including instructions which, when executed, cause at least one processor of a computing system to perform functions, the functions including at least: the method according to any to any one of clause 9 to clause 15.

22. A method comprising the method according to any one of clause 1 to clause 8, and the method according to any one of clause 9 to clause 15.

23. A computing system including a memory and at least one processor configured to perform the method according to clause 22.

24. A tangible computer readable medium including instructions which, when executed, cause at least one processor of a computing system to perform functions, the functions including at least: the method according to clause 22.

25. A method including:

at a first computing system of a first data center, DC, the first DC having first applications controllable by one or more computing entities external to the first DC:

obtaining an indication that the first applications at the first DC are no longer controllable by the one or more computing entities external to the first DC;

determining, based on the indication, that the first applications at the first DC are to operate in a disaster recovery mode; and in response to the determination:

causing an indication that the first applications at the first DC are to operate in the disaster recovery mode to be communicated to one or more of the first applications at the first DC that are already executing at the first DC when the determination is made; and causing the indication that the first applications at the first DC are to operate in the disaster recovery mode to be communicated to one or more of the first applications at the first DC that start to execute at the first DC after the determination is made; and at a second computing system of a second DC:

obtaining an indication that the first applications at the first DC are no longer controllable by the one or more computing entities external to the first DC;

determining, based on the indication, that the second DC is to provide a failover for the first DC; and in response to the determination, causing one or more second applications at the second DC to operate in a failover mode to provide a failover for one or more of the first applications at the first DC.

26. The method according to clause 25, wherein the method comprises, at the first computing system of the first data center, the method according to any one of clause 2 to clause 8.

27. The method according to clause 25 or clause 26, wherein obtaining the indication that the first applications at the first DC are no longer controllable by the one or more computing entities external to the first DC includes one or both of:

at the first computing system of the first DC:

determining that one or more communications connections between the first DC and the second DC have become inoperative; and at the second computing system of the second DC:

determining that the one or more communications connections between the first DC and the second DC have become inoperative.

28. A system including a first data center, DC, and a second DC, the first DC including:

a first computing system for controlling first applications at the first DC, the first applications being controllable by one or more computing entities external to the first DC, the first computing system including:

a first memory; and at least one first processor configured to:

obtain an indication that the first applications at the first DC are no longer controllable by the one or more computing entities external to the first DC;

determine, based on the indication, that the first applications at the first DC are to operate in a disaster recovery mode; and in response to the determination:

causing an indication that the first applications at the first DC are to operate in the disaster recovery mode to be communicated to one or more of the first applications at the first DC that are already executing at the first DC when the determination is made; and causing the indication that the first applications at the first DC are to operate in the disaster recovery mode to be communicated to one or more of the first applications at the first DC that start to execute at the first DC after the determination is made; and the second DC including:

a second computing system including:

a second memory; and at least one second processor configured to:

obtain an indication that the first applications at the first DC are no longer controllable by the one or more entities external to the first DC;

determine, based on the indication, that the second DC is to provide a failover for the first DC; and in response to the determination, causing one or more second applications at the second DC to operate in a failover mode to provide a failover for one or more of the first applications at the first DC.

29. The system according to clause 25, wherein the at least one first processor is configured to perform the method according to any one of clause 2 to clause 8.

The invention claimed is:

1. A computing system for controlling applications at a data center, DC, the applications being controllable by one or more computing entities external to the DC, the computing system including:

a memory; and at least one processor configured to:

obtain an indication that the applications at the DC are no longer controllable by the one or more computing entities external to the DC;

determine, based on the indication, that the applications at the DC are to operate in a disaster recovery mode; and in response to the determination:

cause an indication that the applications at the DC are to operate in the disaster recovery mode to be communicated to one or more of the applications at the DC that are already executing at the DC when the determination is made; and cause the indication that the applications at the DC are to operate in the disaster recovery mode to be communicated to one or more of the applications at the DC that start to execute at the DC after the determination is made.

2. The computing system of claim 1, wherein causing the indication to be communicated to the one or more of the applications at the DC that start to execute at the DC after the determination is made, includes, the at least one processor further configured to:

cause data, representing the indication, to be written to a location in storage which applications are configured to access when starting to execute at the DC.

3. The computing system of claim 2, wherein the one or more of the applications at the DC already executing at the DC are configured to access the location, and causing, at the computing system of the DC, the data to be written to the location in storage causes the indication to be communicated to the one or more of the applications at the DC already executing at the DC.

4. The computing system of claim 2, wherein causing, at the computing system of the DC, the data to be written to the location in storage, includes, the at least one processor further configured to:

cause a function to be modified so as to represent the indication, the function being stored in a library that is used by the applications at the DC, wherein the library is accessible by the applications at the DC when starting to execute at the DC, the function being one that the applications at the DC call from the library when starting to execute at the DC.

5. The computing system of claim 1, wherein causing the indication to be communicated to the one or more applications at the DC already executing at the DC includes the at least one processor further configured to:

cause data, representing the indication, to be written to a location in storage which applications are configured to access when executing at the DC.

6. The computing system of claim 1, wherein causing the indication to be communicated to the one or more applications at the DC already executing at the DC includes the at least one processor further configured to:

transmit a message, including data representing the indication, to the one or more applications at the DC already executing at the DC, over an internal communications network of the DC.

7. The computing system of claim 6, wherein transmitting the message includes multicasting the message to the one or more applications at the DC already executing at the DC over the internal communications network.

8. The computing system of claim 1, wherein obtaining the indication that applications at the DC are no longer controllable by the one or more entities external to the DC includes, the at least one processor further configured to:

determine that one or more communications connections between the DC and one or more further data centers, DCs, have become inoperative.

9. A tangible computer readable medium including instructions which, when executed, cause at least one processor of a computing system to perform functions, the computing system being for controlling applications at a data center, DC, the applications being controllable by one or more computing entities external to the DC, the functions including at least:

obtaining an indication that applications at the DC are no longer controllable by the one or more computing entities external to the DC;

determining, based on the indication, that the applications at the DC are to operate in a disaster recovery mode; and in response to the determination:

causing an indication that the applications at the DC are to operate in a disaster recovery mode to be communicated to one or more of the applications at the DC that are already executing at the DC when the determination is made; and causing the indication that the applications at the DC are to operate in the disaster recovery mode to be communicated to one or more of the applications at the DC that start to execute at the DC after the determination is made.

10. The tangible computer readable medium according to claim 9, wherein causing the indication to be communicated to the one or more of the applications at the DC that start to execute at the DC after the determination is made, includes, at the computing system of the DC:

causing data, representing the indication, to be written to a location in storage which applications are configured to access when starting to execute at the DC.

11. The tangible computer readable medium according to claim 10, wherein the one or more of the applications at the DC already executing at the DC are configured to access the location, and causing, at the computing system of the DC, the data to be written to the location in storage causes the indication to be communicated to the one or more of the applications at the DC already executing at the DC.

12. The tangible computer readable medium according to claim 10, wherein causing, at the computing system of the DC, the data to be written to the location in storage includes:

causing a function to be modified so as to represent the indication, the function being stored in a library that is used by the applications at the DC, wherein the library is accessible by the applications at the DC when starting to execute at the DC, the function being one that the applications at the DC call from the library when starting to execute at the DC.

13. The tangible computer readable medium according to claim 9, wherein causing the indication to be communicated to the one or more applications at the DC already executing at the DC includes, at the computing system of the DC:

causing data, representing the indication, to be written to a location in storage which applications are configured to access when executing at the DC.

14. The tangible computer readable medium according to claim 9, wherein causing the indication to be communicated to the one or more applications at the DC already executing at the DC includes, at the computing system of the DC:

transmitting a message, including data representing the indication, to the one or more applications at the DC already executing at the DC, over an internal communications network of the DC.

15. The tangible computer readable medium according to claim 14, wherein transmitting the message includes multicasting the message to the one or more applications at the DC already executing at the DC over the internal communications network.

16. The tangible computer readable medium according to claim 9, wherein obtaining the indication that applications at the DC are no longer controllable by the one or more entities external to the DC includes, at the computing system of the DC:

determining that one or more communications connections between the DC and one or more further data centers, DCs, have become inoperative.

* * * * *